United States Patent
Dinan

(10) Patent No.: US 10,397,913 B2
(45) Date of Patent: *Aug. 27, 2019

(54) INFORMATION EXCHANGE BETWEEN BASE STATIONS

(71) Applicant: Comcast Cable Communications, LLC, Philadelphia, PA (US)

(72) Inventor: Esmael Hejazi Dinan, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,252

(22) Filed: Nov. 20, 2017

(65) Prior Publication Data

US 2018/0077692 A1  Mar. 15, 2018

Related U.S. Application Data

(63) Continuation of application No. 15/184,532, filed on Jun. 16, 2016, now Pat. No. 9,826,519, which is a
(Continued)

(51) Int. Cl.
*H04W 72/04* (2009.01)
*H04L 5/00* (2006.01)
*H04W 92/20* (2009.01)

(52) U.S. Cl.
CPC ........... *H04W 72/042* (2013.01); *H04L 5/001* (2013.01); *H04L 5/0032* (2013.01);
(Continued)

(58) Field of Classification Search
CPC ..... H04L 5/0053; H04L 5/0048; H04L 5/001; H04L 5/0092; H04L 5/0032;
(Continued)

(56) References Cited

U.S. PATENT DOCUMENTS 6,711,120 B1 * 3/2004 Laroia .................. H04L 5/026
370/204
7,372,813 B1  5/2008 Cimino et al.
(Continued)

FOREIGN PATENT DOCUMENTS

WO   2010053984 A2   5/2010
WO   2011052643 A1   5/2011
(Continued)

OTHER PUBLICATIONS

3GPP TSG RAN WG1 #69 R1-122794, May 21-25, 2012, Prague, Czech Republic, Source: Qualcomm Incorporated. Title: Mapping of e-PDCCH in presence of other signals.
(Continued)

*Primary Examiner* — Will W Lin
(74) *Attorney, Agent, or Firm* — Banner & Witcoff, Ltd.

(57) ABSTRACT

Methods and apparatuses are described for wireless communications involving base stations. A base station may configure a downlink channel (e.g., a physical downlink control channel) based on the configuration of a downlink channel associated with another base station. One or more base stations may manage overlap between downlink channels.

59 Claims, 8 Drawing Sheets

Related U.S. Application Data continuation of application No. 13/850,228, filed on Mar. 25, 2013, now Pat. No. 9,497,756.

(60) Provisional application No. 61/642,472, filed on May 4, 2012, provisional application No. 61/615,347, filed on Mar. 25, 2012.

(52) U.S. Cl.
CPC .......... H04L 5/0053 (2013.01); H04L 5/0092 (2013.01); H04W 72/0426 (2013.01); *H04L 5/0023* (2013.01); *H04W 92/20* (2013.01)

(58) Field of Classification Search
CPC .. H04L 5/0023; H04W 72/04; H04W 72/042; H04W 72/0426; H04W 92/20
See application file for complete search history.

(56) References Cited

U.S. PATENT DOCUMENTS

| | | | |
|---|---|---|---|
| 7,924,475 B2 | 4/2011 | Suzuki | |
| 7,924,755 B2 | 4/2011 | Xu et al. | |
| 8,009,760 B2 | 8/2011 | Ahn et al. | |
| 8,019,017 B2 | 9/2011 | Ahn et al. | |
| 8,238,475 B2 | 8/2012 | Malladi et al. | |
| 8,245,092 B2 | 8/2012 | Kotecha et al. | |
| 8,369,280 B2 | 2/2013 | Dinan | |
| 8,422,455 B1 | 4/2013 | Dinan | |
| 8,427,976 B1 | 4/2013 | Dinan | |
| 8,437,303 B2 | 5/2013 | Dinan | |
| 8,446,844 B1 | 5/2013 | Dinan | |
| 8,483,172 B1 | 7/2013 | Dinan | |
| 8,526,393 B1 | 9/2013 | Dinan | |
| 8,526,459 B2 | 9/2013 | Dinan | |
| 8,531,990 B1 | 9/2013 | Dinan | |
| 8,532,684 B2 | 9/2013 | Chien et al. | |
| 8,571,056 B1 | 10/2013 | Dinan | |
| 8,576,794 B1 | 11/2013 | Dinan | |
| 8,582,527 B2 | 11/2013 | Dinan | |
| 8,614,983 B2 | 12/2013 | Classon et al. | |
| 8,626,104 B2 | 1/2014 | Huang et al. | |
| 8,626,218 B2 | 1/2014 | Wang | |
| 8,699,449 B2 | 4/2014 | Dinan | |
| 8,705,461 B2 | 4/2014 | Bala et al. | |
| 8,711,731 B1 | 4/2014 | Dinan | |
| 8,737,315 B2 | 5/2014 | Shiizaki et al. | |
| 8,804,772 B2 | 8/2014 | Dinan | |
| 8,811,333 B2 | 8/2014 | Dinan | |
| 8,842,637 B2 | 9/2014 | Dinan | |
| 8,908,633 B2 | 12/2014 | Dinan | |
| 8,953,550 B2 | 2/2015 | Dinan | |
| 8,989,130 B2 | 3/2015 | Dinan | |
| 9,213,080 B2 | 12/2015 | Siomina et al. | |
| 9,220,105 B2 | 12/2015 | Dinan | |
| 9,247,534 B2 | 1/2016 | Han et al. | |
| 9,496,995 B2 | 11/2016 | Kim et al. | |
| 9,729,370 B2 | 8/2017 | Cheng et al. | |
| 2004/0097867 A1 | 5/2004 | Fraser et al. | |
| 2005/0117536 A1 | 6/2005 | Cho et al. | |
| 2005/0220000 A1 | 10/2005 | Kim et al. | |
| 2005/0243793 A1 | 11/2005 | Kim et al. | |
| 2008/0112308 A1 | 5/2008 | Cleveland | |
| 2008/0165832 A1 | 7/2008 | Fukuda et al. | |
| 2008/0287068 A1 | 11/2008 | Etemad | |
| 2008/0310540 A1 | 12/2008 | Tiirola et al. | |
| 2008/0316956 A1 | 12/2008 | Turanyi et al. | |
| 2008/0318528 A1 | 12/2008 | Hooli et al. | |
| 2009/0040956 A1 | 2/2009 | Shinoi | |
| 2009/0059844 A1 | 3/2009 | Ko et al. | |
| 2009/0109890 A1 | 4/2009 | Chow et al. | |
| 2009/0180435 A1 | 7/2009 | Sarkar | |
| 2009/0219875 A1 | 9/2009 | Kwak et al. | |
| 2009/0238241 A1 | 9/2009 | Hooli et al. | |
| 2009/0252077 A1 | 10/2009 | Khandekar et al. | |
| 2009/0316656 A1 | 12/2009 | Zhao et al. | |
| 2010/0034163 A1 | 2/2010 | Damnjanovic et al. | |
| 2010/0120442 A1 | 5/2010 | Zhuang et al. | |
| 2010/0135257 A1 | 6/2010 | Higuchi et al. | |
| 2010/0227569 A1 | 9/2010 | Bala et al. | |
| 2010/0272017 A1 | 10/2010 | Terry et al. | |
| 2010/0272066 A1 | 10/2010 | Wang et al. | |
| 2010/0281323 A1 | 11/2010 | Wang et al. | |
| 2010/0316000 A1 | 12/2010 | Burbidge et al. | |
| 2010/0322190 A1 | 12/2010 | Satou et al. | |
| 2010/0323704 A1 | 12/2010 | Tailor et al. | |
| 2011/0026645 A1 | 2/2011 | Luo et al. | |
| 2011/0032839 A1 | 2/2011 | Chen et al. | |
| 2011/0044391 A1 | 2/2011 | Ji et al. | |
| 2011/0064035 A1 | 3/2011 | Guerreiro et al. | |
| 2011/0065435 A1 | 3/2011 | Pancorbo Marcos et al. | |
| 2011/0075624 A1 | 3/2011 | Papasakellariou et al. | |
| 2011/0075640 A1 | 3/2011 | Mo et al. | |
| 2011/0075650 A1 | 3/2011 | Zhu et al. | |
| 2011/0085521 A1 | 4/2011 | Terry | |
| 2011/0085618 A1 | 4/2011 | Zhuang et al. | |
| 2011/0103395 A1 | 5/2011 | Ratnakar et al. | |
| 2011/0116456 A1 | 5/2011 | Gaal et al. | |
| 2011/0141985 A1 | 6/2011 | Larsson et al. | |
| 2011/0149894 A1* | 6/2011 | Luo ...................... H04W 16/02 370/329 |
| 2011/0170489 A1 | 7/2011 | Han et al. | |
| 2011/0170496 A1 | 7/2011 | Fong et al. | |
| 2011/0199926 A1 | 8/2011 | Zheng et al. | |
| 2011/0200139 A1 | 8/2011 | Jen et al. | |
| 2011/0201323 A1 | 8/2011 | Wu et al. | |
| 2011/0216846 A1 | 9/2011 | Lee et al. | |
| 2011/0243090 A1 | 10/2011 | Grovlen et al. | |
| 2011/0249578 A1 | 10/2011 | Nayeb Nazar et al. | |
| 2011/0249633 A1 | 10/2011 | Hong et al. | |
| 2011/0255629 A1 | 10/2011 | Ko et al. | |
| 2011/0261768 A1 | 10/2011 | Luo | |
| 2011/0261897 A1 | 10/2011 | Jen et al. | |
| 2011/0268062 A1 | 11/2011 | Ji et al. | |
| 2011/0268204 A1 | 11/2011 | Choi et al. | |
| 2011/0268207 A1 | 11/2011 | Choi et al. | |
| 2011/0269492 A1 | 11/2011 | Wang | |
| 2011/0274031 A1 | 11/2011 | Gaal et al. | |
| 2011/0274066 A1 | 11/2011 | Tee et al. | |
| 2011/0275359 A1 | 11/2011 | Sebire et al. | |
| 2011/0310823 A1 | 12/2011 | Nam et al. | |
| 2011/0319068 A1 | 12/2011 | Kim et al. | |
| 2011/0319120 A1 | 12/2011 | Chen et al. | |
| 2012/0003945 A1 | 1/2012 | Liu et al. | |
| 2012/0008570 A1 | 1/2012 | Li et al. | |
| 2012/0039180 A1 | 2/2012 | Kim et al. | |
| 2012/0039199 A1 | 2/2012 | Chen et al. | |
| 2012/0039369 A1 | 2/2012 | Choi et al. | |
| 2012/0039402 A1 | 2/2012 | Clerckx et al. | |
| 2012/0044910 A1 | 2/2012 | Maeda et al. | |
| 2012/0045014 A1 | 2/2012 | Damnjanovic et al. | |
| 2012/0051257 A1 | 3/2012 | Kim et al. | |
| 2012/0054258 A1 | 3/2012 | Li et al. | |
| 2012/0063302 A1 | 3/2012 | Damnjanovic et al. | |
| 2012/0087318 A1 | 4/2012 | Liu et al. | |
| 2012/0087424 A1 | 4/2012 | Brown | |
| 2012/0088514 A1 | 4/2012 | Lee et al. | |
| 2012/0099466 A1 | 4/2012 | Aoyama et al. | |
| 2012/0106465 A1 | 5/2012 | Haghighat et al. | |
| 2012/0121031 A1 | 5/2012 | Tang et al. | |
| 2012/0122440 A1 | 5/2012 | Krishnamurthy et al. | |
| 2012/0127938 A1 | 5/2012 | Lv et al. | |
| 2012/0128088 A1 | 5/2012 | Ko et al. | |
| 2012/0140743 A1 | 6/2012 | Pelletier et al. | |
| 2012/0157140 A1 | 6/2012 | Kim et al. | |
| 2012/0163250 A1 | 6/2012 | Chin et al. | |
| 2012/0182879 A1 | 7/2012 | Tamura et al. | |
| 2012/0207099 A1 | 8/2012 | Lindh et al. | |
| 2012/0207126 A1* | 8/2012 | Qu ...................... H04L 5/005 370/330 |
| 2012/0213095 A1 | 8/2012 | Krishnamurthy et al. | |
| 2012/0213096 A1 | 8/2012 | Krishnamurthy et al. | |
| 2012/0213123 A1 | 8/2012 | Futaki | |
| 2012/0213261 A1 | 8/2012 | Sayana et al. | |

(56) References Cited

U.S. PATENT DOCUMENTS

| | | |
|---|---|---|
| 2012/0218952 A1 | 8/2012 | Kwon et al. |
| 2012/0236803 A1 | 9/2012 | Vujcic |
| 2012/0250520 A1 | 10/2012 | Chen et al. |
| 2012/0270591 A1 | 10/2012 | Sun et al. |
| 2012/0275400 A1 | 11/2012 | Chen et al. |
| 2012/0281556 A1 | 11/2012 | Sayana et al. |
| 2012/0281566 A1 | 11/2012 | Pelletier et al. |
| 2012/0281646 A1 | 11/2012 | Liao et al. |
| 2012/0287865 A1 | 11/2012 | Wu et al. |
| 2012/0300718 A1 | 11/2012 | Ji et al. |
| 2012/0300728 A1 | 11/2012 | Lee et al. |
| 2012/0320846 A1 | 12/2012 | Papasakellariou et al. |
| 2013/0003604 A1 | 1/2013 | Blankenship et al. |
| 2013/0003639 A1 | 1/2013 | Noh et al. |
| 2013/0003663 A1 | 1/2013 | Blankenship et al. |
| 2013/0003672 A1 | 1/2013 | Dinan |
| 2013/0003673 A1 | 1/2013 | Dinan |
| 2013/0010715 A1 | 1/2013 | Dinan |
| 2013/0028236 A1 | 1/2013 | Jung et al. |
| 2013/0034070 A1 | 2/2013 | Seo et al. |
| 2013/0039188 A1 | 2/2013 | Larsson et al. |
| 2013/0039284 A1 | 2/2013 | Marinier et al. |
| 2013/0044693 A1 | 2/2013 | Lindh et al. |
| 2013/0064128 A1 | 3/2013 | Li et al. |
| 2013/0083753 A1 | 4/2013 | Lee et al. |
| 2013/0089078 A1 | 4/2013 | Liu et al. |
| 2013/0094464 A1 | 4/2013 | Li et al. |
| 2013/0100888 A1 | 4/2013 | Shimezawa et al. |
| 2013/0100921 A1 | 4/2013 | Nakao et al. |
| 2013/0107835 A1 | 5/2013 | Aiba et al. |
| 2013/0107861 A1 | 5/2013 | Cheng et al. |
| 2013/0114419 A1 | 5/2013 | Chen et al. |
| 2013/0114425 A1 | 5/2013 | Sayana et al. |
| 2013/0114517 A1* | 5/2013 | Blankenship ......... H04L 5/0053 370/329 |
| 2013/0114521 A1 | 5/2013 | Frenne et al. |
| 2013/0114529 A1* | 5/2013 | Chen .................... H04L 1/1812 370/329 |
| 2013/0114542 A1 | 5/2013 | Dinan |
| 2013/0121267 A1 | 5/2013 | Koorapaty et al. |
| 2013/0121277 A1 | 5/2013 | To et al. |
| 2013/0128857 A1 | 5/2013 | Nakao |
| 2013/0129018 A1 | 5/2013 | Ko et al. |
| 2013/0136098 A1 | 5/2013 | Li et al. |
| 2013/0142064 A1 | 6/2013 | Dinan |
| 2013/0142141 A1 | 6/2013 | Dinan |
| 2013/0155897 A1 | 6/2013 | Ihm et al. |
| 2013/0155990 A1 | 6/2013 | Nishio et al. |
| 2013/0155996 A1 | 6/2013 | Horiuchi et al. |
| 2013/0156125 A1 | 6/2013 | Ko et al. |
| 2013/0163551 A1 | 6/2013 | He et al. |
| 2013/0176936 A1 | 7/2013 | Takahashi et al. |
| 2013/0176974 A1 | 7/2013 | Dinan |
| 2013/0182627 A1 | 7/2013 | Lee et al. |
| 2013/0182654 A1 | 7/2013 | Hariharan et al. |
| 2013/0195020 A1 | 8/2013 | Frederiksen et al. |
| 2013/0195057 A1 | 8/2013 | Dinan |
| 2013/0195068 A1 | 8/2013 | Baker et al. |
| 2013/0215871 A1 | 8/2013 | Dinan |
| 2013/0223301 A1 | 8/2013 | Lee et al. |
| 2013/0223381 A1 | 8/2013 | Dinan |
| 2013/0230015 A1 | 9/2013 | Hoymann et al. |
| 2013/0235839 A1 | 9/2013 | Kim et al. |
| 2013/0242750 A1 | 9/2013 | Baker et al. |
| 2013/0242777 A1 | 9/2013 | Choi et al. |
| 2013/0242880 A1 | 9/2013 | Miao et al. |
| 2013/0250864 A1 | 9/2013 | Zhang |
| 2013/0250882 A1 | 9/2013 | Dinan |
| 2013/0258987 A1 | 10/2013 | Chun et al. |
| 2013/0279459 A1 | 10/2013 | Lee et al. |
| 2013/0286997 A1 | 10/2013 | Davydov et al. |
| 2013/0294369 A1 | 11/2013 | Dinan |
| 2013/0294385 A1 | 11/2013 | Dinan |
| 2013/0301597 A1 | 11/2013 | Kim et al. |
| 2013/0308576 A1 | 11/2013 | Dinan |
| 2013/0315190 A1 | 11/2013 | Horiuchi et al. |
| 2013/0322382 A1 | 12/2013 | Dinan |
| 2013/0329612 A1 | 12/2013 | Seo et al. |
| 2013/0329686 A1 | 12/2013 | Kim et al. |
| 2014/0003379 A1 | 1/2014 | Kang et al. |
| 2014/0003385 A1 | 1/2014 | Dinan |
| 2014/0029577 A1 | 1/2014 | Dinan |
| 2014/0044084 A1 | 2/2014 | Lee et al. |
| 2014/0050192 A1 | 2/2014 | Kim et al. |
| 2014/0056244 A1 | 2/2014 | Frenne et al. |
| 2014/0064235 A1 | 3/2014 | Seo et al. |
| 2014/0064240 A1 | 3/2014 | Dinan |
| 2014/0071952 A1 | 3/2014 | Kim et al. |
| 2014/0105150 A1 | 4/2014 | Kim et al. |
| 2014/0105155 A1 | 4/2014 | Kim et al. |
| 2014/0105156 A1 | 4/2014 | Jang et al. |
| 2014/0105165 A1 | 4/2014 | Dinan |
| 2014/0112280 A1 | 4/2014 | Lee et al. |
| 2014/0112283 A1 | 4/2014 | Kim et al. |
| 2014/0126487 A1 | 5/2014 | Chen et al. |
| 2014/0126505 A1 | 5/2014 | Chun et al. |
| 2014/0153515 A1 | 6/2014 | Chun et al. |
| 2014/0177577 A1 | 6/2014 | Dinan |
| 2014/0177578 A1 | 6/2014 | Dinan |
| 2014/0177598 A1 | 6/2014 | Dinan |
| 2014/0192759 A1 | 7/2014 | Son et al. |
| 2014/0254410 A1 | 9/2014 | Seo et al. |
| 2014/0254420 A1 | 9/2014 | Kim et al. |
| 2014/0328315 A1 | 11/2014 | Dinan |
| 2015/0003381 A1 | 1/2015 | Dinan |
| 2015/0124754 A1* | 5/2015 | Forster ................... H04W 4/20 370/329 |
| 2015/0131609 A1 | 5/2015 | Dinan |
| 2016/0135156 A1 | 5/2016 | Lee et al. |

FOREIGN PATENT DOCUMENTS

| | | |
|---|---|---|
| WO | 2011085195 A1 | 7/2011 |
| WO | 2013140241 A1 | 9/2013 |
| WO | 2013167967 A2 | 11/2013 |

OTHER PUBLICATIONS

3GPP TSG RAN WG1 #68 R1-120267, Dresden, Germany Feb. 6-10, 2012, Source: HTC. Title: Search Space Design for E-PDCCH.

3GPP TSG RAN WG1 #68 R1-120507, Dresden, Germany, Feb. 6-10, 2012, Source: Alcatel-Lucent, Alcatel-Lucent Shanghai Bell. Title: Further details of ePDCCH UE-specific search space design.

3GPP TSG RAN WG1 Meeting #68bis R1-121252, Jeju, Korea, Mar. 26-30, 2012, Source: Alcatel-Lucent Shanghai BEll, Alcatel-Lucent. Title: Search Space Design for ePDCCH.

3GPP TSG RAN WG1 Meeting #68bis R1-121354, Jeju, Korea, Mar. 26-30, 2012, Source: Sharp. Title: Common search space in ePDCCH.

3GPP TSG RAN WG1 #68bis R1-121644, Jeju, Korea, Mar. 26-30, 2012, Source: Samsung. Title: Support of Common Search Space Design for E-PDCCHs.

3GPP TSG RAN WG1 Meeting #69, R1-121977, Prague, Czech Republic, May 21-25, 2012, Source: NTT DOCOMO. Title: Views on Resource Mapping for ePDCCH.

3GPP TSG RAN WG1 #69 R1-122000, Prague, Czech Republic, May 21-25, 2012, Source: Ericsson, ST-Ericsson. Title: Mapping of ePDCCH to RE.

Ericsson: "Control plane aspects of carrier aggregation," 3GPP Draft; R2-092958, RAN WG2, Apr. 28, 2009, San Francisco, USA.

3GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TS 36.321 V10.0.0 (Dec. 2010), 3rd Generation Partnership Project; Technical Specification Group Radio Access Network; Evolved Universal Terrestrial Radio Access (E-UTRA); Medium Access Control (MAC) protocol specification (Release 10).

(56) References Cited

OTHER PUBLICATIONS

3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).
Response to European Office Action—EP 14200113.0—dated Jun. 11, 2015.
3GPP TSG RAN1 #65 R1-111471, Barcelona, Spain, May 9-13, 2011, Source: Samsung, Title: Discussion on Downlink Control Channel Enhancement.
European Search Report—EP 14200113.0—dated Jul. 17, 2015.
Response to EP Office Action—EP App 14200113.0—Filed Feb. 17, 2016.
European Search Report—EP Appl. 15188352.7—dated Aug. 9, 2016.
European Office Action—EP App. 14200113.0—dated Sep. 30, 2016.
Mar. 8, 2018—European Office Action—EP 18157643.0.

\* cited by examiner

INFORMATION EXCHANGE BETWEEN BASE STATIONS

CROSS-REFERENCE TO RELATED APPLICATIONS

This Application is a Continuation of application Ser. No. 15/184,532 filed on Jun. 16, 2016, and entitled "Information Exchange Between Base Stations." Application Ser. No. 15/184,532 is a Continuation of application Ser. No. 13/850,228 filed on Mar. 25, 2013, and entitled "Base Station Radio Resource Management." Application Ser. No. 13/850,228 claims the benefit of U.S. Provisional Application 61/642,472 filed on May 4, 2012, and entitled "Reference Signals and Channel Feedback in Wireless Networks." Application Ser. No. 13/850,228 claims the benefit of U.S. Provisional Application 61/615,347 filed on Mar. 25, 2012, and entitled "Control Channel Information Exchange Between Base Stations." The entire contents of these applications are incorporated herein by reference in their entirety.

BRIEF DESCRIPTION OF THE SEVERAL VIEWS OF THE DRAWINGS

An example embodiment of the present invention is described herein with reference to the drawings, in which.

DETAILED DESCRIPTION OF EMBODIMENTS

Embodiments of the present invention provide methods and systems for control channel information transmission between base stations. The technology disclosed herein is in the technical field of multicarrier communication systems. More particularly, the technology disclosed herein is related to a method and system for control channel information transmission between base stations in a multicarrier communication system.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
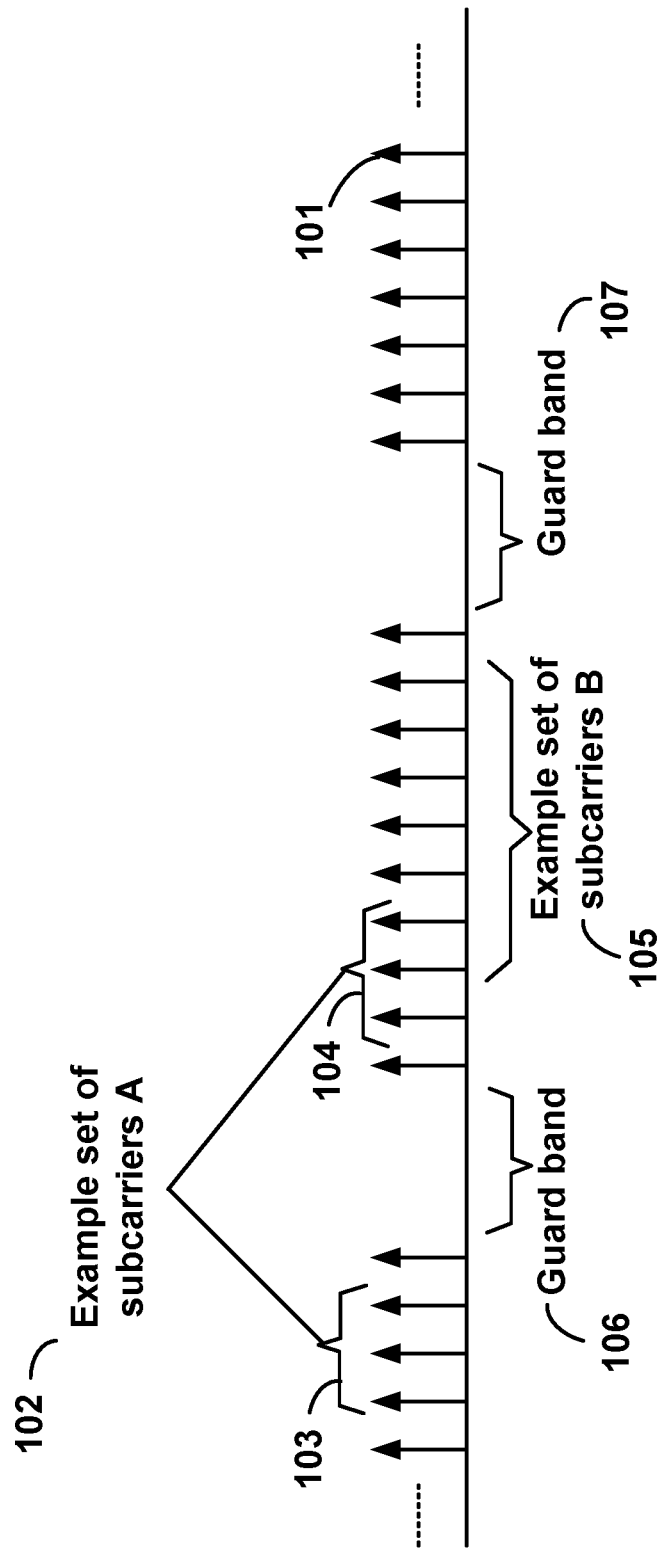
FIG. 1 is a diagram depicting example sets of OFDM subcarriers according to an example embodiment.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
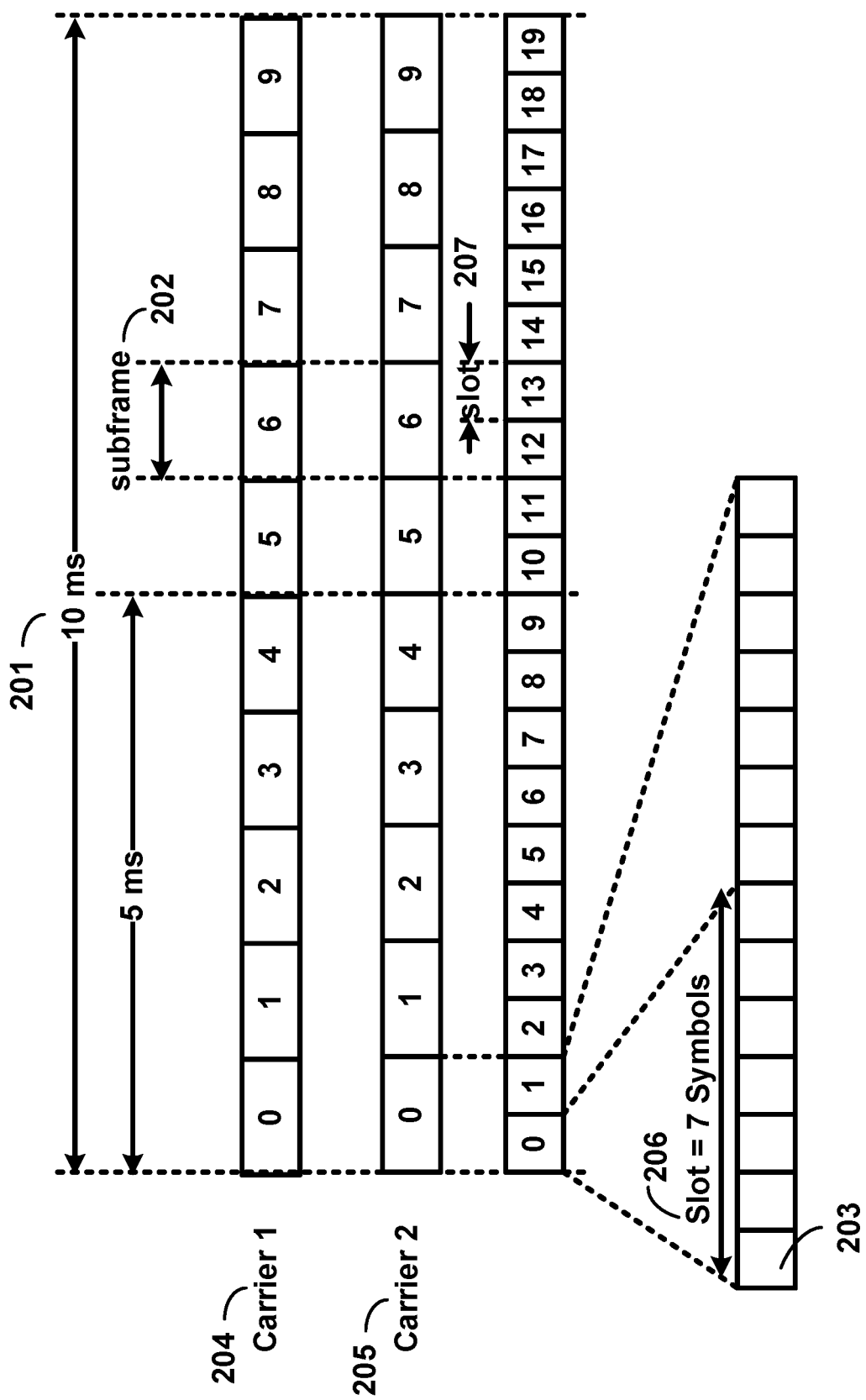
FIG. 2 is a diagram depicting an example transmission and reception time for two carriers, according to an example embodiment.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots 206. For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 10 ms switch-point periodicity may be supported. In an example, subframe 1 in all configurations and subframe 6 in configurations with 5 ms switch-point periodicity may include DwPTS, GP and UpPTS. Subframe 6 in configurations with 10 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
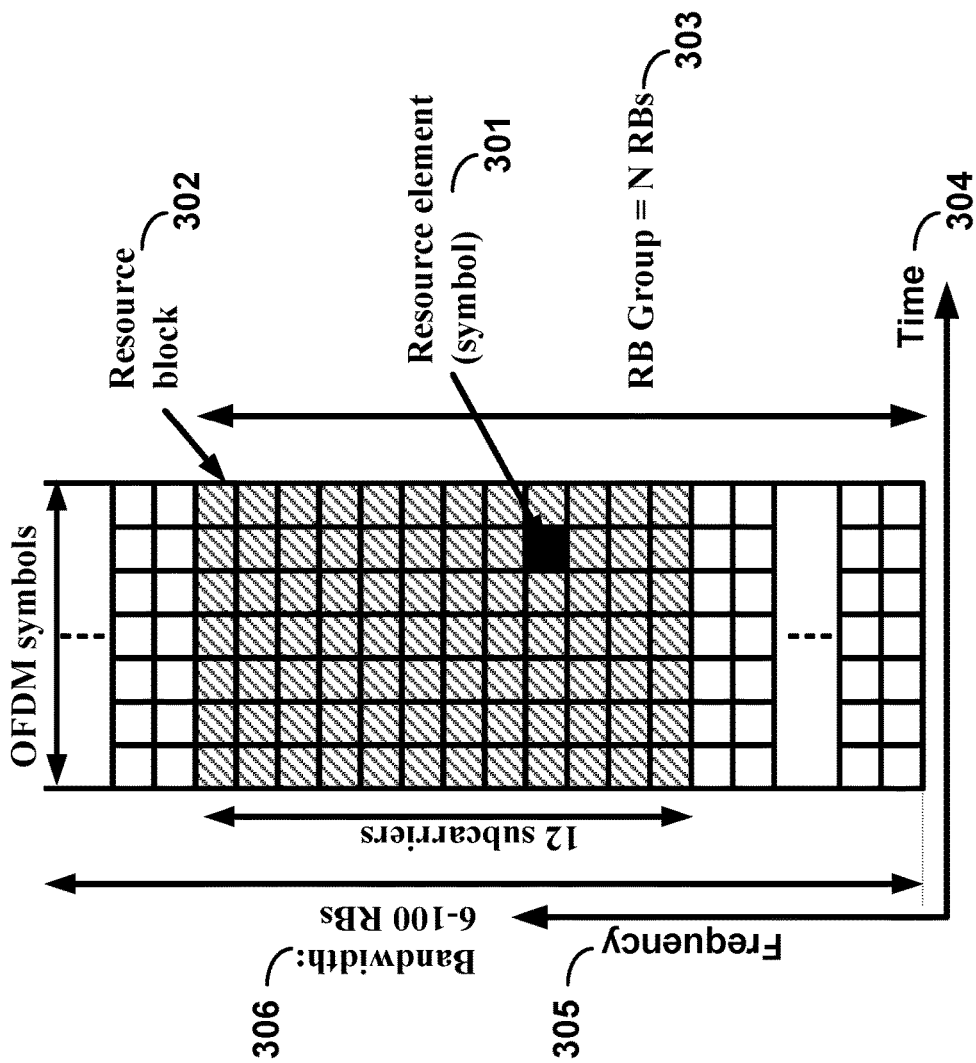
FIG. 3 is a diagram depicting OFDM radio resources according to an example embodiment.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a predefined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, . . . , 18} and {15, . . . , 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
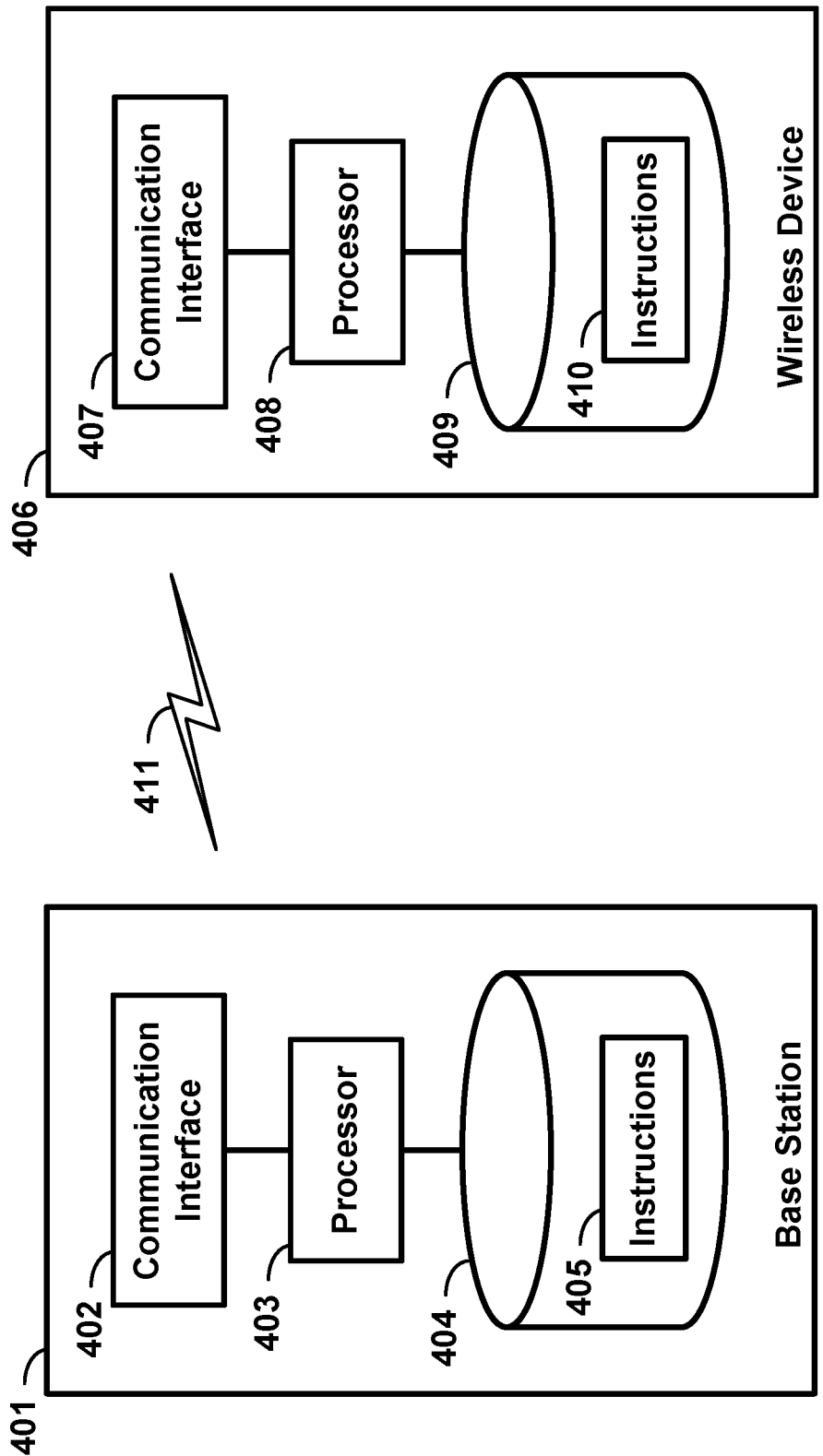
FIG. 4 is a block diagram of a base station and a wireless device, according to an example embodiment.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 5:
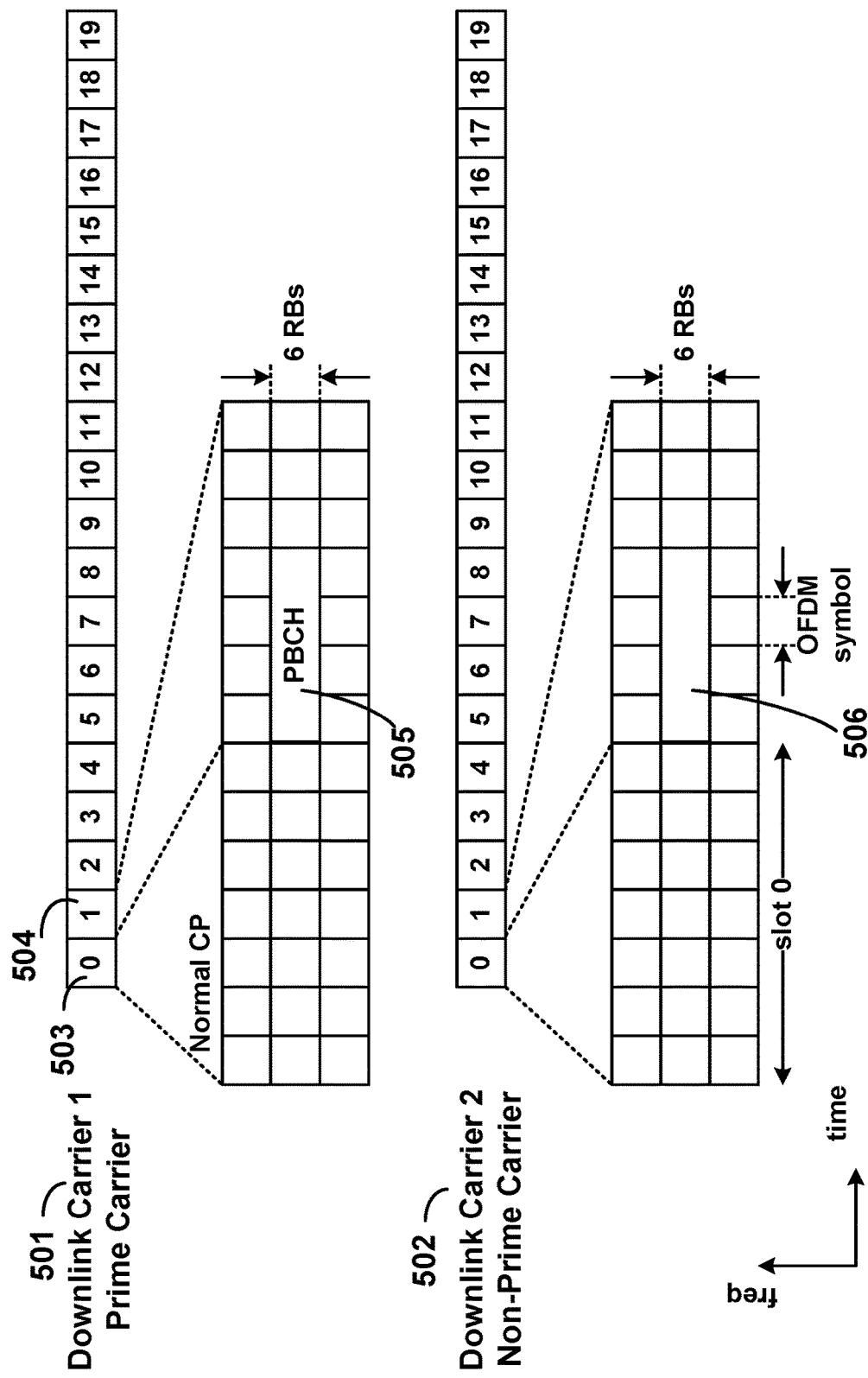
FIG. 5 is a diagram depicting time and frequency resources for two carriers according to an example embodiment.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

According to some of the various aspects of embodiments, a base station may receive a first radio resource control (RRC) message from a wireless device (UE). The first message may be received on a primary carrier (uplink) during the connection set up process. The first message may be a UE capability information message. The UE may transfer its radio access capability information to the eNB (E-UTRAN). If the UE has changed its E-UTRAN radio access capabilities, the UE may request higher layers to initiate a procedure that would result in the update of UE radio access capabilities using a new RRC connection. A UE may be able to communicate with the E-UTRAN about its radio access capabilities, such as the system (including the release and frequency band) that the UE supports, the UE receive and transmit capabilities (single/dual radio, dual receiver), and/or the like. The first RRC message may comprise one or more parameters indicating whether the wireless device supports an enhanced physical downlink control channel (ePDCCH). The first RRC message may comprise one or more parameters providing information (explicitly or implicitly) on whether the wireless device supports new carrier types (NCT). Example of NCTs are stand alone NCT, synchronized NCT, unsynchronized NCT, and/or the like.

The base station may transmit selectively and if the one or more parameters indicates support of ePDCCH, at least one second RRC message configured to cause, in the wireless device, configuration of one or more ePDCCHs. The base station may receive UE capability information from the wireless device. If the wireless device does not support ePDCCH, then the base station does not configure ePDCCH for the wireless device. If the wireless device indicates that it supports ePDCCH configuration, the base station may decide to configure ePDCCH or not to configure ePDCCH for the wireless device. This decision is based on internal base station mechanisms, and may be based, at least in part, on base station configuration settings, UE QoS profile, UE bearers, mobility, a combination thereof, and/or the like.

The at least one second RRC message configured to cause, in the wireless device, configuration of ePDCCH on existing configured carriers (for example a primary cell, a secondary cell), or on newly added cells (legacy or NCT cell). The at least one second RRC message may further cause, in the wireless device, configuration of other radio channels and parameters, such as, uplink data channel, downlink data channel, uplink control channel, downlink control channel, power control parameters, measurement parameters, radio bearers, a combination thereof, and/or the like. The at least one second RRC message configuring ePDCCH may comprise at least one of: subframe subset configuration, ePDCCH starting position in the subset of subframes, and at least one ePDCCH transmission and resource configuration. Some of the parameters may be considered optional.

According to some of the various aspects of embodiments, an ePDCCH of a downlink carrier may be configured for a subset of subframes in a plurality of subframes. The at least one second RRC message may comprise subframe configuration information. For example at least one second RRC message may comprise a bitmap indicating which subframe(s) in radio frames are configured with ePDCCH resources. The ePDCCH bitmap may configure the subframes which the UE may monitor search space(s) on ePDCCH. A UE may monitor a UE-specific search space in ePDCCH radio resources. The bitmap may be for example 40 bits, and may indicate the ePDCCH subframes for the duration of four frames. For example, a value of zero may indicate no ePDCCH resources in the corresponding subframe for the UE, and a value of one may indicate ePDCCH resources are configured for the UE in the corresponding subframe. In this example, the same pattern may be repeated in every four frame (40 subframes). In another example for TDD frame structure, the bitmap may be 20, 60, or 70 bits. If the bitmap is not included in the at least one second message configuring EPDCCH, then ePDCCH may be configured in every subframe. A UE may monitor the UE-specific search space on ePDCCH in all subframes except when according to some pre-defined rules when other parameters, for example, measurement parameters, may not allow monitoring of ePDCCH in that subframe.

According to some of the various aspects of embodiments, the at least one second RRC message may comprise a starting symbol parameter indicating ePDCCH starting symbol in ePDCCH configured subframes. The starting symbol parameter may indicate the OFDM starting symbol for any ePDCCH and PDSCH scheduled by ePDCCH on the same cell, if the UE is not configured with coordinated multimode transmission mode. If starting symbol parameter is not present in the RRC message configuring ePDCCH, the UE may derive the starting OFDM symbol of ePDCCH and PDSCH scheduled by the ePDCCH from PCFICH (format indicator parameter) transmitted in the same subframe. In an example embodiment, values zero, one, two, and three may applicable for dl-Bandwidth greater than ten resource blocks, and values two, three, and four may be applicable. The starting symbol parameter may not be configured employing the starting symbol parameter when UE is configured with coordinated multimode transmission mode.

According to some of the various aspects of embodiments, in a given subframe of a cell, some of the UEs may be configured with ePDCCH and some other UEs may not be configured with ePDCCH in the given subframe. The PDSCH starting position in the given subframe for UEs that are configured with ePDCCH in the cell may be determined employing the starting symbol parameter. PDSCH starting position in the given subframe for UEs that are not configured with ePDCCH in the cell may be determined employing PCFICH or other RRC messages.

According to some of the various aspects of embodiments, the at least one second RRC message configuring ePDCCH may comprise at least one ePDCCH transmission and resource configuration. For example, ePDCCH may comprise one or two ePDCCH transmission and resource configuration. An ePDCCH transmission and resource configuration may be identified by an ePDCCH index. The ePDCCH index may be used to add or release ePDCCH transmission and resource configuration to or from an existing configured ePDCCH. The ePDCCH transmission and resource configuration may comprise one or more parameters, including one or more of the following parameters: frequency resources, frequency distribution, frequency assignment, reference sequence, corresponding uplink control channel parameter, and coordinated transmission mode parameters. The ePDCCH transmission and resource configuration may be applicable to the subset of subframes in which ePDCCH is configured.

According to some of the various aspects of embodiments, frequency resources parameter may indicate the number of physical resource-block pairs used for the ePDCCH. For example this may have the value of two, four or six. The frequency distribution parameter may indicate whether the frequency resources (resource blocks) are distributed or localized. In localized distribution, resource blocks in ePDCCH transmission may be contiguous, and in a distributed distribution resource blocks in ePDCCH may be distributed in the carrier bandwidth. The frequency assignment parameter indicates the assignment of specific resource blocks in resource blocks of LTE carrier to the ePDCCH. The frequency assignment, for example, may be an index to a specific combination of physical resource-block pairs for ePDCCH set as defined in a pre-defined look-up table. The reference sequence parameter may indicate the demodulation reference signal scrambling sequence initialization parameter for ePDCCH symbols. The corresponding uplink control channel parameter may indicate PUCCH format 1a and 1b resource starting offset for the ePDCCH set. For example, uplink PUCCH radio resources for transmitting ACK/NACK for downlink transport blocks (MAC/PHY packets) transmitted in the PDSCH scheduled by ePDCCH is determined based, at least in part, employing the corresponding uplink control channel parameter. The uplink control channel parameter may indicate the frequency start offset in terms of resource blocks in the uplink carrier. The coordinated transmission mode parameters may indicate the starting OFDM symbol, the related rate matching parameters and quasi-collocation assumption for ePDCCH when the UE is configured in coordinated transmission mode. A coordinated transmission mode parameter may provide the index of PDSCH configuration for coordinated transmission mode.

In another example embodiment, the same RRC message may configure cell(s) and ePDCCH in the downlink of the cell. The RRC message causing the configuration of carriers (cells) in the wireless device may comprise an identifier for a carrier in the plurality of carriers, information identifying a carrier type for each carrier in the plurality of carriers, and information associating at least one non-backward compatible carrier (NCT) with a backward compatible carrier. The control message may further comprise information associating a non-backward compatible carrier with a backward compatible carrier. Carrier type for example may be backward compatible, non-backward compatible. The carrier type may further determine if the carrier is synchronized, non-synchronized, and/or a segment carrier. The carrier type may determine if the non-backward compatible carrier is a stand-alone carrier or depends on (is associated with) another carrier. The carrier type information may be transmitted explicitly by a carrier type parameter, or may be determined based one or more parameters in the RRC message(s).

According to some of the various aspects of embodiments, an ePDCCH may carry scheduling assignments for uplink and downlink of one or more cells. Scheduling assignments includes transmission format (modulation and coding) and resource assignment information. The base station may transmit first transmission format and scheduling information by the base station on an ePDCCH in a first subframe of the subset of subframes. The first transmission format and the scheduling information may be for one or more first data packets (transport blocks) transmitted on a data channel of the first carrier. The base station may transmit the one or more first data packets to the wireless device on the first data channel in the first subframe according to the transmission format and the scheduling information.

According to some of the various aspects of embodiments, an ePDCCH of a first carrier may provide scheduling assignment for transport blocks (packets) transmitted on uplink data channel and downlink data channel of the first carrier. Cross carrier scheduling may be configured by higher layers (e.g., RRC), for example, for a second carrier. The ePDCCH of a first carrier may also provide scheduling assignment for transport blocks (packets) transmitted on uplink data channel and downlink data channel of the second carrier. ACK/NACK for packets transmitted in the downlink (according to ePDCCH assignment) may be provided in PUCCH resources identified by the corresponding uplink control channel parameter (in RRC message). ACK/NACK may also be piggybacked and be transmitted in uplink transport blocks transmitted in the uplink shared channel. ACK/NACK for packets transmitted in the uplink (according to ePDCCH assignment) may be provided in the downlink employing physical HARQ indicator channel of the first carrier. Radio resource configuration of physical HARQ indicator channel of the first carrier may be determined according to master information block transmitted in PBCH, or may be transmitted by higher layers (e.g. RRC) when the first carrier is configured. HARQ radio resources (symbol(s), subcarrier(s)) transmitting ACK/NACK for an uplink packet scheduled by ePDCCH assignment may be determined according to a physical resource block offset of the uplink resources. For example, a pre-defined relationship (e.g. look-up table, formula, relationship) may determine downlink HARQ resources for an uplink packet transmitted on physical uplink shared channel.

According to some of the various aspects of embodiments, ePDCCH resources may be configured for one or more carriers in one or more configured carriers for a wireless device. For example, ePDCCH may be configured for at least one of a primary carrier, a secondary carrier, a backward-compatible carrier or a non-backward compatible carrier. In an example embodiment, the starting symbol of ePDCCH and PDSCH for a primary carrier or for a backward-compatible secondary carrier may be one of the second, third, fourth symbol, or fifth symbol (respectively corresponding to symbol 1, 2, 3, 4). In another example, the starting symbol of ePDCCH and PDSCH for a non-backward compatible secondary carrier may be one of the first, second, third, fourth symbol, or fifth symbol (respectively corresponding to symbol 0, 1, 2, 3, 4). At least the first symbol in a primary carrier or in a backward compatible secondary carrier is allocated to legacy PCFICH, legacy PDCCH and legacy HARQ channels. In a non-backward compatible secondary carrier legacy PCFICH, legacy PDCCH and/or legacy HARQ channels may be avoided as a whole in the carrier. This may increase spectral efficiency of non-backward compatible carriers compared with backward compatible carriers.

According to some of the various aspects of embodiments, an ePDCCH may be transmitted on a backward compatible or non-backward compatible carrier. The ePDCCH may not be transmitted in certain subframes, e.g., subframes configured with multicast transmission and some TDD special subframes. Physical multicast channel (PMCH) may occupy all resource blocks of a carrier. RRC message(s) may cause configuration of the subset of subframes in which a UE may monitor ePDCCH. If one the configured ePDCCH subframes overlaps with a PMCH subframe, the UE may monitor UE-specific search space on PDCCH of the subframe and may not search ePDCCH resources on a subframe with configured PMCH transmission. In new carrier types, PDCCH may be configured for a subset of subframes. If legacy control region is configured on a new carrier type, a reference signal transmitted in the control radio resource region may be used to demodulate the legacy control channel.

According to some of the various aspects of embodiments, legacy downlink control channels may be configured for subframes with configured PMCH. The subframes that are configured with PMCH may be configured with PDCCH, PCFICH, and/or PHICH. PDCCH resources in PMCH may be employed for scheduling uplink packets in an uplink subframe. This may increase uplink spectral efficiency in a new type carrier. In another example embodiment, configuration parameters of PDCCH may be included in the RRC message configuring the new carrier type. PDCCH configuration parameters may include at least: subframe configuration, and/or PDCCH duration. Subframe configuration parameters for example could be in the form of a bitmap. For example a bitmap with length of 40 bits may indicate the subset of subframes with configured PDCCH with a period of 4 frames. In another example embodiment, a subframe index and a subframe period may be used to determine the subset of subframes with a configured PDCCH. A PDCCH may occupy one, two, three or four symbols. PDCCH duration parameter in RRC message may indicate the number of symbols allocated in to PDCCH. In another example embodiment, subframe configuration parameter in the RRC message may indicate the subset of subframes with configured PCFICH, and PDCCH configuration. PCFICH in each subframe may determine the duration of PCFICH in the same subframe. In another example embodiment, subframe configuration parameter in the RRC message may indicate the subset of subframes with configured with PCFICH, PDCCH, and PHICH. PHICH radio resources may be employed for transmission of ACK/NACK in the downlink for packets transmitted in the uplink.

According to some of the various aspects of embodiments, RRC message(s) may configure cross carrier scheduling for a new type carrier. RRC message may configure cross carrier scheduling for a subset of subframes. The cross carrier scheduling configuration parameters may comprise a bitmap indicating the subset of subframes that cross carrier scheduling is configured for a new type carrier. For example, cross carrier scheduling may be configured for subframes including PMCH transmission. In non-PMCH subframes, the ePDCCH of the same carrier may be used for scheduling assignments. In PMCH subframes, the ePDCCH or PDCCH of another carrier may be employed for uplink packet assignment of the carrier employing cross carrier scheduling.

According to some of the various aspects of embodiments, new type (also called non-backward compatible or non-prime) carriers may be configured to work in association with another backward compatible carrier. New carrier types may be deployed in heterogeneous networks and/or homogeneous networks, and may coexist with backward compatible carriers in the same base station/sector. In another example embodiment, new carrier types may be configured on standalone bases without backward compatible carriers. New type carriers may have reduced legacy control signalling and common reference signals. The interference and overhead levels on the new carrier types may be reduced compared to backward compatible carriers. A new carrier type may be synchronized with another carrier in the same band. In another example embodiment, a new carrier type may not be synchronized with another carrier.

New carrier types may transmit reduced or no common reference signal compared with backward compatible carriers. In one example embodiment, new carrier type may carry one reference signal port (for example, common reference signal port 0 resource elements per physical resource block) and may employ legacy common reference signal sequences. Common reference signals may be transmitted within one subframe with five ms periodicity. In this example, two of the ten subframes in a frame may transmit common reference signals. The common reference signal may be employed by the wireless device for example, for channel state measurement, time and/or frequency synchronization, receiver parameter estimation, and/or the like. Common reference signal may be transmitted on all resource blocks in the bandwidth or in a subset of resource block. In an example embodiment, the bandwidth of common reference signal may be configured by higher layers (e.g. RRC layer). For example, common reference signal may be transmitted on 6 resource blocks or 25 resource blocks according to RRC configuration. RRC configuration parameters for example may include at least one of: configuration of common reference subframes (e.g. subframe index, periodicity, and/or bitmap configuration), frequency resources (common reference signal bandwidth, frequency offset, and/ or frequency shift in resource blocks). In an example embodiment a subframe bitmap parameter may indicate the subset of subframes transmitting common reference signals. In an example embodiment, a resource block bitmap parameter may indicate the resource blocks transmitting common reference signals. Configuration of common reference signal may consider that the reduced common reference signal may impact the time and frequency synchronization performance and radio resource monitoring measurements. In an example embodiment, common reference signal may be transmitted in the same subframe as the primary and secondary synchronization signals. In another example embodiment, a subframe offset parameter may be configured by higher layers (e.g. RRC). A cell-specific frequency shift may be used for common reference signals. The motivation of frequency shift is to reduce common reference signal collision among neighbouring cells. In an example embodiment, the frequency shift may be determined by the physical cell identifier. In another example embodiment, frequency shift may be configured employing configuration parameters comprised in RRC messages configuring a new type carrier.

According to some of the various aspects of embodiments, a new type carrier may be configured as a synchronized carrier. The UE may be configured to acquire time and frequency synchronization from a backward compatible carrier to which the synchronized carrier is associated with. In an example embodiment, RRC message(s) configuring the new type carrier may comprise the carrier index of the backward compatible carrier associated with the new type carrier. The synchronized and non-synchronized carrier may include reduced CRS transmission configurable by parameters comprised in an RRC message. In an example embodiment, a synchronized carrier may be configured to not transmit any common reference signals and/or synchronization signals.

According to some of the various aspects of embodiments, primary and secondary signals may be transmitted on a non-synchronized carrier. The primary and secondary synchronization signals may be transmitted in the centre six resource blocks of a carrier. The time location of the primary and secondary synchronization signal may be configured using RRC message configuring the new type carrier. In an example configuration of a new carrier type, there may be collisions between radio resource of primary/secondary synchronization signals and demodulation reference signals. To resolve this issue, demodulation reference signals may not be transmitted when it overlaps with the synchronization signals. In an example embodiment, primary and secondary synchronization signals may not be transmitted on a synchronized new carrier type. This may reduce signalling overhead and increase spectral efficiency. An RRC message configuring a new type carrier may provide configuration parameters for primary and secondary synchronization signals and/or may indicate whether primary and/or secondary synchronization signals are transmitted or not.

New carrier types may support existing and/or new transmission modes compared with backward compatible carrier. RRC layer may provide information to the UE indicating which transmission modes are employed for transmission of transport blocks on a new carrier type. According to some of the various aspects of embodiments, sounding reference configuration for backward compatible carriers may be improved to include the capability of transmitting sounding reference signal on all active uplink resource blocks of a carrier. In legacy sounding reference signal configuration, sounding reference signal may not be transmitted on resource blocks of PUCCH radio resources in the uplink. Sounding reference signal configuration may be improved to include all resource blocks employed for PUSCH (including resource blocks employed for PUCCH in legacy carrier, which are available for PUSCH in new type carriers). The SRS bandwidth may be chosen assuming that all active RBs in the uplink may be used for PUSCH. Then eNB may be able to sound any resource block usable for PUSCH transmission.

Figure 6:
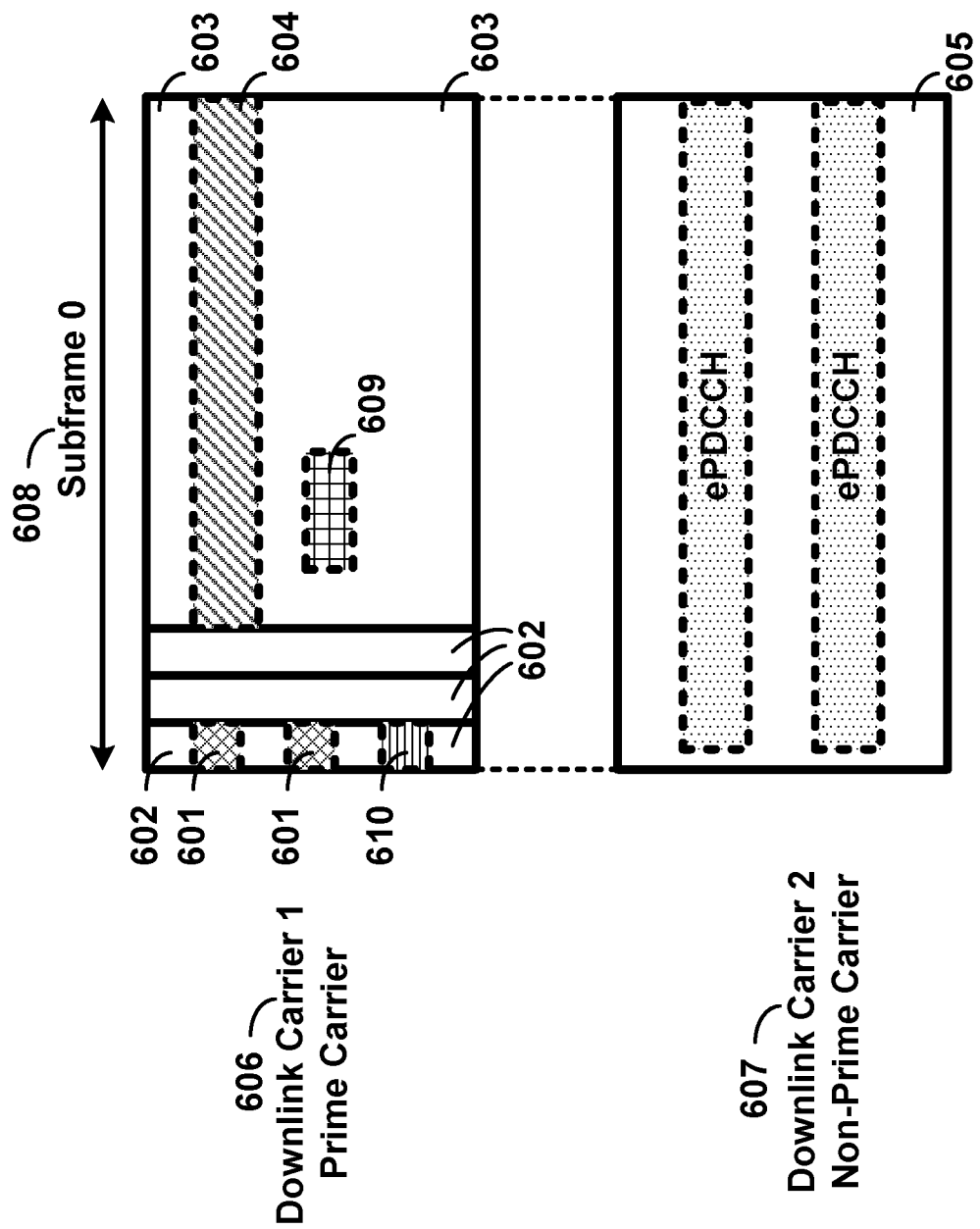
FIG. 6 is a diagram illustrating transmission of data and control information according to an example embodiment.

FIG. 5 is a diagram depicting time and frequency resources for carrier one 501 and carrier two 502 and FIG. 6 is a diagram illustrating transmission of data and control information according to one aspect of the illustrative embodiments. An example embodiment of the invention provides a method and system for a wireless transmitter in a communication network including a plurality of carriers. Each of the plurality of carriers may include a plurality of OFDM subcarriers. Transmission time may be divided into a plurality of subframes, and each subframe in the plurality of subframes may further be divided into a plurality of OFDM symbols.

The transmitter may transmit a synchronization signal including a primary synchronization signal and a secondary synchronization signal on a first carrier 501. The synchronization signal may indicate a physical cell ID for the first carrier 501. It may also provide timing information for the first carrier 501. If the second carrier is a synchronized carrier, the synchronization signal may also provide timing information for a second carrier 502 in the plurality of carriers. Subframe timing of the second data channel is provided by the synchronization signal transmitted on the first carrier. The synchronization signal may be transmitted using a plurality of subcarriers in the in the middle of the frequency band of the first carrier 501 on the first and sixth subframes (subframe 0 and 5) of each frame in the plurality of frames. Primary and secondary synchronization signal may occupy a bandwidth equal to six resource blocks. A physical broadcast channel (PBCH) 505 may be transmitted in slot one 504 of subframe 0 of the first carrier 501. According to an example embodiment, if the second carrier is a non-synchronized carrier, it may transmit its own primary and secondary synchronization signal. In another example embodiment, synchronization signal may also be transmitted in synchronized carriers.

The transmitter may transmit a first plurality of data packets on a first data channel 603 of the first carrier 606 on a first plurality of OFDM subcarriers. A first plurality of OFDM subcarriers may exclude the plurality of subcarriers used for transmission of the primary and secondary synchronization signals in the first and sixth subframes in the plurality of frames.

The transmitter may transmit a first plurality of broadcast system information messages on the first data channel 603. The plurality of broadcast system information messages include radio link configuration information for a wireless device receiving the first carrier 606 and the second carrier 607 signals. The transmitter may transmit a second plurality of data packets on a second data channel 605 on a second plurality of OFDM subcarriers of the second carrier 607.

In one example embodiment, the second carrier may not transmit synchronization signal, then the second plurality of OFDM subcarriers of the second carrier 502 may include the OFDM subcarriers in the middle of the frequency band of the second carrier 502 in the first and sixth subframes in the plurality of frames. No primary synchronization signal and no secondary synchronization signal may be transmitted on the second carrier in radio resource. No broadcast system information message may be transmitted on the second data channel 605. No physical broadcast channel may be transmitted in radio resource 506. Multiple options may be available, for example second carrier may transmit synchronization signal but do not transmit the physical broadcast channel. In another example, both carriers may transmit both synchronization signal and physical broadcast channel.

The first plurality of data packets and the second plurality of data packets may be transmitted using a plurality of physical resource blocks including reference signal symbols and data symbols. The broadcast system information messages may be RRC system information blocks. The radio link configuration information may include measurement configuration, uplink channel configuration or handover parameters.

The primary synchronization signal may be generated using a frequency-domain Zadoff-Chu sequence. The primary synchronization signal may be mapped to the last OFDM symbol in slots zero and ten for FDD frame structure. The primary synchronization signal may be mapped to the third OFDM symbol in subframes 1 and 6 for TDD frame structure.

The secondary synchronization signal may be generated using an interleaved concatenation of two length-31 binary sequences. The concatenated sequence may be scrambled with a scrambling sequence given by the primary synchronization signal. The portion of the secondary synchronization signal transmitted in subframe zero may be different from the portion of the secondary synchronization signal transmitted in subframe five.

In an example embodiment, cross carrier scheduling may be configured for the second carrier. A control channel 602 may be transmitted on the first carrier 606. The control channel 602 may provide transmission format and scheduling information for the first plurality of data packets and the second plurality of data packets. The control channel 602 may be transmitted on the first carrier 606 starting from the first OFDM symbol of each subframe. The control channel may be a physical downlink control channel. If the second carrier is a new type carrier (non-backward compatible carrier), no physical control format indicator channel and no physical downlink control channel may be transmitted on the second carrier 607. Radio resources of the second data channel 605 may be configured by the base station and may start from the first, second, third, fourth, or fifth OFDM symbol of a subframe of the second carrier 607 and end at the last OFDM symbol of each subframe of the second carrier 607. When cross carrier scheduling is configured, no HARQ feedback may be transmitted on the second carrier 607.

The receiver may receive a synchronization signal including a primary synchronization signal and a secondary synchronization signal on a first carrier 501. The synchronization signal may indicate a physical cell ID for the first carrier. The synchronization signal may be received using a plurality of subcarriers in the in the middle of the frequency band of the first carrier 501 on the first and sixth subframes (subframe 0 and 5) of each frame in the plurality of frames. A physical broadcast channel (PBCH) 505 may be received in slot one 504 of subframe 0 of the first carrier 501.

The receiver may receive a first plurality of data packets on a first data channel 603 of the first carrier 606 on a first plurality of OFDM subcarriers. A first plurality of OFDM subcarriers may exclude the plurality of subcarriers used for transmission of the primary and secondary synchronization signals in the first and sixth subframes in the plurality of frames. The receiver may receive a first plurality of broadcast system information messages on the first data channel 603. The plurality of broadcast system information messages may include radio link configuration information for the wireless receiver receiving the first carrier 606 and the second carrier 607 signals.

The receiver may receive a second plurality of data packets on a second data channel 605 on a second plurality of OFDM subcarriers of the second carrier 607. If synchronization signal is not transmitted on the second carrier or if it is transmitted on a different time, then the second plurality of OFDM subcarriers of the second carrier 607 may include the OFDM subcarriers in the middle of the frequency band of the second carrier 502 in the first and sixth subframes in the plurality of frames. In a synchronized carrier that does not include primary and secondary synchronization signal, no primary synchronization signal and no secondary synchronization signal may be received on the second carrier in radio resource. Subframe timing of the second carrier 607 may be synchronized with subframe timing of the first carrier 606. No broadcast system information message may be received on the second data channel 605. No physical broadcast channel may be received in radio resource 506. Subframe timing of the second data channel may be provided by the synchronization signal received on the first carrier.

The first plurality of data packets and the second plurality of data packets are received using a plurality of physical resource blocks including reference signal symbols and data symbols. The broadcast system information messages may be RRC system information blocks. The radio link configuration information may include measurement configuration, uplink channel configuration, or handover parameters.

The primary synchronization signal may be generated using a frequency-domain Zadoff-Chu sequence. The primary synchronization signal may be mapped to the last OFDM symbol in slots zero and ten for FDD frame structure. The primary synchronization signal may be mapped to the third OFDM symbol in subframes 1 and 6 for TDD frame structure.

The secondary synchronization signal may be generated using an interleaved concatenation of two length-31 binary sequences. The concatenated sequence may be scrambled with a scrambling sequence given by the primary synchronization signal. The portion of the secondary synchronization signal transmitted in subframe zero may be different from the portion of the secondary synchronization signal transmitted in subframe five.

A control channel 602 is received on the first carrier 606. The control channel 602 may provide transmission format and scheduling information for the first plurality of data packets and the second plurality of data packets. The control channel 602 may be received on the first carrier 606 starting from the first OFDM symbol of each subframe. The control channel 602 may be a physical downlink control channel. If the second carrier is a new type carrier, no physical control format indicator channel and no physical downlink control channel may be received on the second carrier 607. Radio resources of the second data channel 605 may start from the first OFDM symbol of each subframe of the second carrier 607 and end at the last OFDM symbol of each subframe of the second carrier 607. If cross carrier scheduling is configured for the second carrier, no HARQ feedback may be received on the second carrier 607.

FIG. 6 is a diagram illustrating data and control transmission channels according to one aspect of the illustrative embodiments. An example embodiment of the present invention provides a method and system for a wireless transmitter in a communication network including a plurality of carriers. Each of the plurality of carriers may include a plurality of OFDM subcarriers. Transmission time may be divided into a plurality of subframes, and each subframe in the plurality of subframes may further be divided into a plurality of OFDM symbols.

The transmitter may transmit a first control channel 601 on the first OFDM symbol of each subframe 608 in the plurality of subframes of a first carrier 606 in the plurality of carriers. Each instance of the first control channel 601 transmitted in a subframe 608 in the plurality of subframes may indicate the number of OFDM symbols in the subframe that are preferably allocated for transmission of a second control channel 602 on the subframe 608 of the first carrier 606.

The transmitter may transmit the second control channel 602 on the first carrier 606. The second control channel 602 may provide transmission format and scheduling information for a first plurality of data packets transmitted on a first data channel 603 of the first carrier 606. The second control channel 602 may be transmitted on the first carrier 606 starting from the first OFDM symbol of the subframe 608. A subset of OFDM subcarriers of the first symbol of each subframe is used by the first control channel, and a second subset of OFDM subcarriers of the first symbol of each subframe is used by the second control channel.

The transmitter may transmit the first plurality of data packets on the first data channel 603. The first data channel transmission may start from the OFDM symbol immediately after the number of OFDM symbols allocated for the second control channel 602. For example in a given subframe, the first, second and third symbols are used by the first and second control channel, and the forth to fourteenth symbols are used by the first data channel.

The transmitter may transmit a control message 604 on the first data channel 603 indicating that radio resources of a second data channel 605 start from the first, second, third, fourth, or fifth OFDM symbol of a subset of subframes of a second carrier 607 in the plurality of carriers. If cross carrier scheduling is configured for the second control channel, the control message may further indicate that the second control channel 602 includes transmission format and scheduling information for a second plurality of data packets transmitted on the second data channel 605 of the second carrier 607. The control message 604 may be transmitted once or when the radio configuration changes. The control message 604 may not be transmitted in every subframe.

The transmitter may transmit the second plurality of data packets on the second data channel 605. In an example embodiment, radio resources for the second data channel 605 may start from the first OFDM symbol and end at the last OFDM symbol of each subframe 608 of the second carrier 607. The transmission format and scheduling information for the second plurality of data packets may be transmitted on the second control channel 602 of the first carrier 606. The starting symbol of data channel 605 and ePDCCH channel may be the same and may be configured by the RRC control message.

Synchronization signal may be transmitted in subframes 0 and 5 in the middle of the band 609 on carrier one. Synchronization signal may or may not be transmitted in carrier two 607 depending on the second carrier configuration. If synchronization signal is not configured, the synchronization signal radio resources may be allocated to the second data channel 605.

The first control channel 601 may be transmitted on a first subset of the plurality of OFDM subcarriers of the first carrier 606. Each instance of the first control channel 601 may indicate one of three possible values after being decoded. The range of possible values of each instance of the first control channel may depend on many parameters including the first carrier bandwidth. For example for a given bandwidth, the first control channel may indicate of three possible values of 1, 2, or 3 symbols. The first control channel 601 is transmitted on the first OFDM symbol of each subframe 608 of the first carrier 606 using QPSK modulation. The first control channel 601 may be coded using a block encoder before transmission. The first control channel 601 may be scrambled by a transmitter ID before transmission. The transmitter ID may be for example the physical cell ID.

The second control channel 602 may be transmitted on a second subset of the plurality of OFDM subcarriers of the first carrier 606. The second control channel 602 may be transmitted using QPSK modulated symbols. The second control channel 602 may be coded by tail biting convolutionally encoder before transmission. The second control channel 602 may further provide power control commands for uplink channels, for example power control commands for physical uplink shared channel or physical uplink control channel. The OFDM subcarriers that are allocated for transmission of the second control channel 602 may occupy the entire bandwidth of the first carrier 606. The second channel may not use the entire subcarriers allocated to it. The second control channel 602 may carry a plurality of downlink control packets in each subframe 608 in the plurality of subframes. Each of the plurality of downlink control packets may be scrambled using a radio network identifier.

The first plurality of data packets and the second plurality of data packets may be encrypted packets. Each of the first plurality of data packets and each of the second plurality of data packets may be assigned to a radio bearer. A first plurality of packets that are assigned to the same radio bearer may be encrypted using an encryption key and at least one parameter that changes substantially rapidly over time.

The control message 604 may be encrypted and may be protected by an integrity header before it is transmitted. The control message 604 may be transmitted by an RRC protocol. The control message 604 may further include configuration information for physical channels for a wireless terminal. The control message 604 may set up or modify at least one radio bearer. The control message 604 may modify configuration of at least one parameter of a MAC layer or a physical layer. The control message 604 may be an RRC connection reconfiguration message.

The control message 604 may be decrypted and its integrity header may be verified before being processed. The control message 604 may be received by an RRC protocol. The control message 604 may further include configuration information for physical channels for the wireless terminal. The control message 604 may set up or modify at least one radio bearer. The control message 604 may modify configuration of at least one parameter of a MAC layer or a physical layer. The control message 604 may be an RRC connection reconfiguration message.

In an example embodiment, a prime or a non-prime carrier (equally called non-backward compatible carrier) may include ePDCCH resources. ePDCCH is enhanced physical downlink control channel and may act as PDCCH for the non-prime carrier or prime carrier. ePDCCH may carry scheduling information for downlink and uplink shared channels and may also carrier power control information for uplink transmissions.

Figure 7:
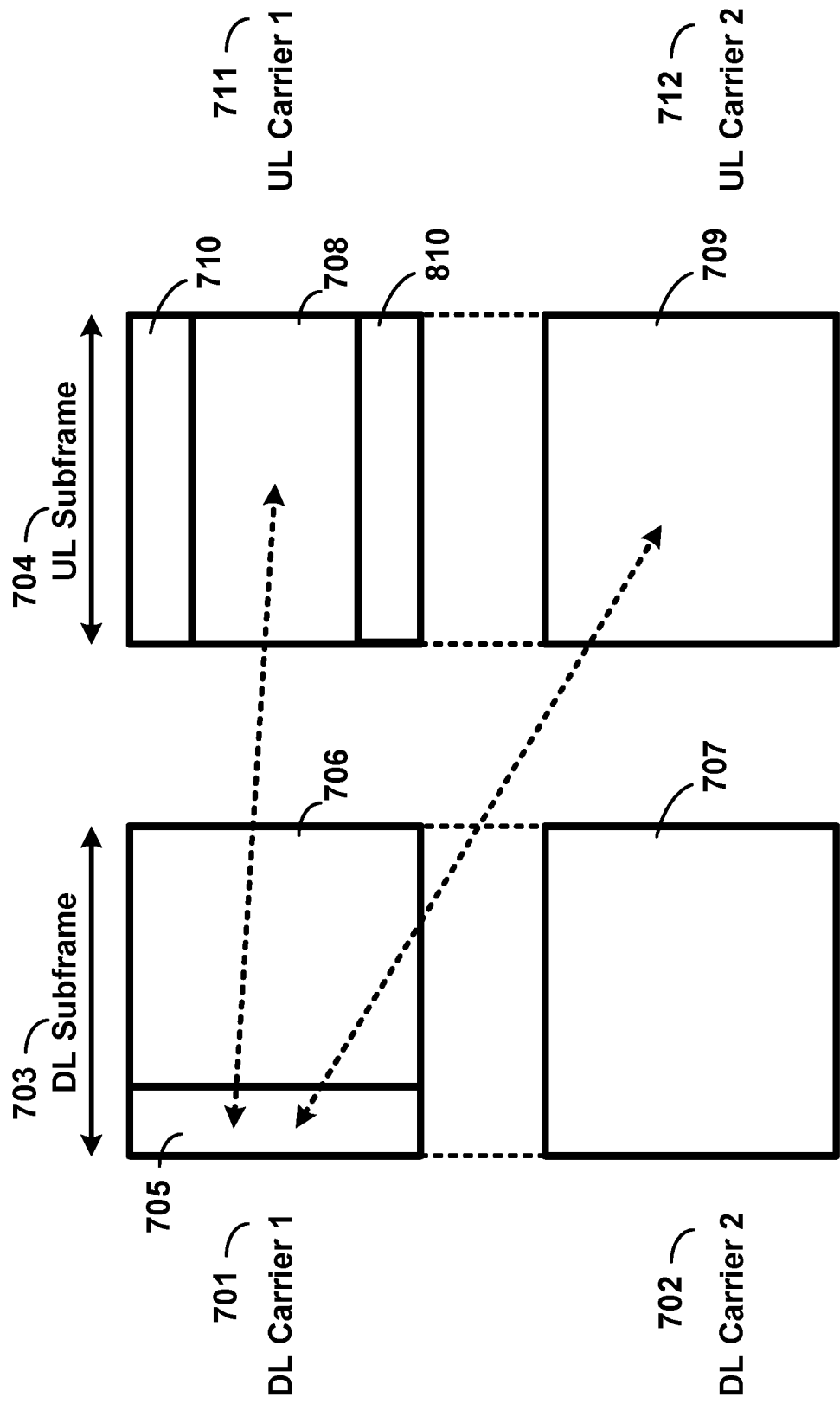
FIG. 7 is a diagram illustrating uplink and downlink subframes according to an example embodiment.

FIG. 7 is a diagram illustrating uplink and downlink subframes for downlink carrier one 701, downlink carrier two 702, uplink carrier one 711, and uplink carrier 2, according to an example embodiment. DL subframe 703 is not necessary at the same time than uplink subframe 704. Radio resources 705 are allocated for PCFICH, PDCCH, and PHICH. PDCCH provides scheduling information for downlink shared channels 706 and 707 and uplink shared channels 708 and 709. PHICH provides positive or negative acknowledgements for packets transmitted on uplink shared channels 708 and 709. PUCCH is transmitted on radio resources 710 and 810 and may comprise: positive and negative acknowledgements for data packets transmitted on the downlink carrier one and the downlink carrier two; and channel state information for the downlink carrier one and the downlink carrier two.

Figure 8:
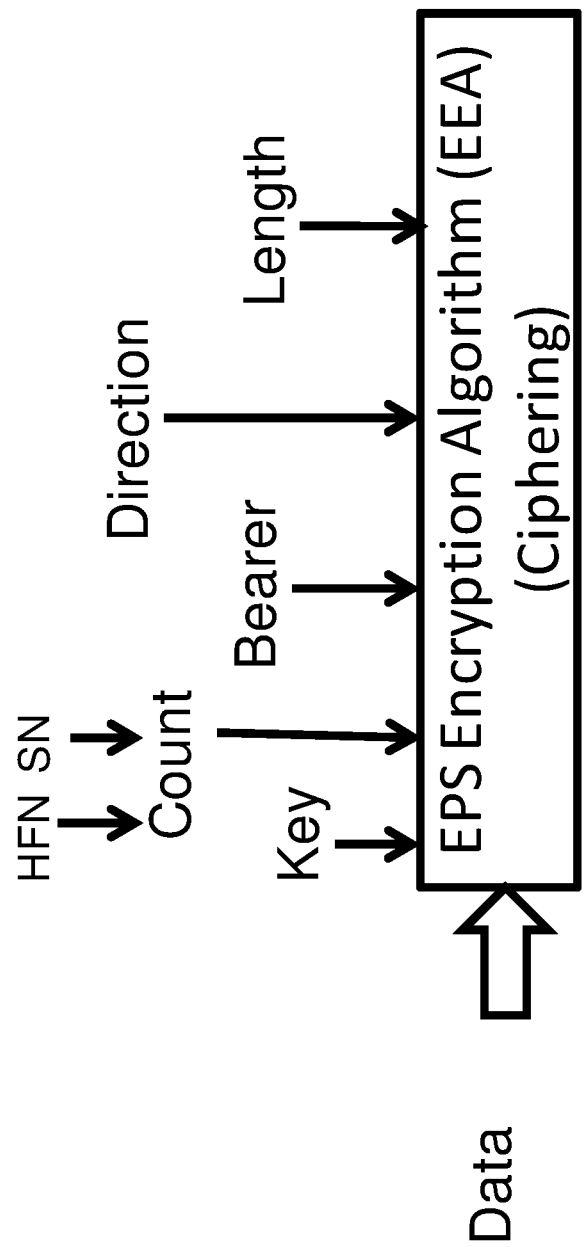
FIG. 8 is a block diagram illustrating an encryption mechanism according to an example embodiment.

FIG. 8 is a block diagram illustrating an encryption mechanism according to an example embodiment. Data and control packets are encrypted using EPS encryption algorithm. The encryption algorithm input parameters may include a key, hyper frame number, sequence number, bearer identity, uplink or downlink direction parameter, or packet length. The control packets may also use an integrity mechanism that uses at least one of these parameters in the integrity checksum calculation process.

In an example embodiment, a first base station comprises a communication interface, a processor, and a memory storing instructions that, when executed, cause the first base station to perform certain functions. The base station may transmit a control message to a wireless device. The control message may comprise an identifier for each carrier in the plurality of carriers and information identifying a carrier type for each carrier in the plurality of carriers. The plurality of carriers may comprise at least one backward compatible carrier and at least one non-backward compatible carrier. The carrier type may be one of backward compatible and non-backward compatible. The first base station may transmit a plurality of packets to the wireless device on the at least one non-backward compatible carrier and the at least one backward compatible carrier. FIG. 5, FIG. 6 and FIG. 7 show examples of a backward compatible carrier and a non-backward compatible carrier. In FIG. 5 and FIG. 6, downlink carrier 1 prime carriers 501 and 606 are backward compatible carriers and downlink carrier 2 non-prime carrier 502 and 607 are non-backward compatible carriers. In FIG. 7, DL Carrier 1 is a backward compatible carrier and DL carrier 2 is a non-backward compatible carrier.

In another example embodiment, the base station may transmit a control message (RRC message) to a wireless device. The control message may comprise an identifier for each carrier in the plurality of carriers and information identifying a carrier type for each carrier in the plurality of carriers. The plurality of carriers may comprise at least one backward compatible carrier and at least one non-backward compatible carrier. The same or a different RRC message may also configure ePDCCH one or more ePDCCH configuration for one or more backward compatible and/or non-backward compatible carrier. Common reference signal overhead of each of the at least one non-backward compatible carrier may be lower than common reference signal overhead of each of the at least one backward compatible carrier. The carrier type may be one of backward compatible and non-backward compatible. The base station may transmit a plurality of packets to the wireless device on the at least one non-backward compatible carrier and the at least one backward compatible carrier.

In another example embodiment, a first base station may transmit a control message to a wireless device. The control message may comprise an identifier for each carrier in the plurality of carriers, information identifying a carrier type for each carrier in the plurality of carriers, and information associating at least one non-backward compatible carrier in the at least one non-backward compatible carrier with a backward compatible carrier in the at least one backward compatible carrier. The control message may further comprise information associating a non-backward compatible carrier in the at least one non-backward compatible carrier with a backward compatible carrier in the at least one backward compatible carrier. The plurality of carriers may comprise at least one backward compatible carrier and at least one non-backward compatible carrier. Common reference signal overhead of each of the at least one non-backward compatible carrier may be lower than common reference signal overhead of each of the at least one backward compatible carrier. The carrier type may be one of backward compatible and non-backward compatible. When cross carrier scheduling is configured for the non-backward compatible carrier, the base station may transmit a plurality of control messages to the wireless device on a backward compatible carrier. The plurality of control messages may comprise scheduling information for transmission of packets on a non-backward compatible carrier associated with the backward compatible carrier. The plurality of control messages may be PDCCH or ePDCCH control messages. The base station may transmit a plurality of packets to the wireless device on the non-backward compatible carrier according to the scheduling information.

In another example embodiment, a first base station may transmit a control message to a wireless device. The control message may comprise an identifier for each carrier in the plurality of carriers, information identifying a carrier type for each carrier in the plurality of carriers, and information associating at least one non-backward compatible carrier or each non-backward compatible carrier in the at least one non-backward compatible carrier with a backward compatible carrier in the at least one backward compatible carrier. The plurality of carriers may comprise at least one backward compatible carrier, and at least one non-backward compatible carrier. Common reference signal overhead of each of the at least one non-backward compatible carrier may be lower than common reference signal overhead of each of the at least one backward compatible carrier. The carrier type may be one of backward compatible and non-backward compatible. The base station may receive channel state information of one of the at least one non-backward compatible carrier from the wireless device on an uplink carrier associated with one of the at least one backward compatible carrier. The one non-backward compatible carrier may be associated with the one backward compatible carrier.

In an example embodiment, a wireless device comprises a communication interface, a processor, and a memory storing instructions that, when executed, cause the wireless device to perform certain functions. The wireless device may receive a control message from a first base station. The control message may comprise an identifier for each carrier in the plurality of carriers and information identifying a carrier type for each carrier in the plurality of carriers. The plurality of carriers may comprise at least one backward compatible carrier, and at least one non-backward compatible carrier. The carrier type may be one of backward compatible and non-backward compatible. The wireless device may receive a plurality of packets from the first base station on the at least one non-backward compatible carrier and the at least one backward compatible carrier.

In another example embodiment, a wireless device may receive a control message from a first base station. The control message may comprise an identifier for each carrier in the plurality of carriers and information identifying a carrier type for each carrier in the plurality of carriers. The plurality of carriers may comprise at least one backward compatible carrier and at least one non-backward compatible carrier. Common reference signal overhead of each of the at least one non-backward compatible carrier may be lower than common reference signal overhead of each of the at least one backward compatible carrier. The carrier type may be one of backward compatible and non-backward compatible. The wireless device may receive a plurality of packets to from the first base station on the at least one non-backward compatible carrier and the at least one backward compatible carrier.

In another example embodiment, a wireless device may receive a control message from a first base station. The control message may comprise an identifier for each carrier in the plurality of carriers, information identifying a carrier type for each carrier in the plurality of carriers, and information associating one non-backward compatible or each non-backward compatible carrier in the at least one non-backward compatible carrier with a backward compatible carrier in the at least one backward compatible carrier. The plurality of carriers may comprise at least one backward compatible carrier, and at least one non-backward compatible carrier. Common reference signal overhead of each of the at least one non-backward compatible carrier may be lower than common reference signal overhead of each of the at least one backward compatible carrier. The carrier type may be one of backward compatible and non-backward compatible. The wireless device may receive a plurality of control messages from the first base station on a backward compatible carrier. The plurality of control messages may comprise scheduling information for reception of packets on a non-backward compatible carrier associated with the backward compatible carrier. The wireless device may receive a plurality of packets from the first base station on the non-backward compatible carrier according to the scheduling information. In an example embodiment, the same RRC message(s) that configure carriers may also configure ePD- CCH resources on one or more of the carriers and may comprise ePDCCH configuration parameters for one or more of the carriers.

In another example embodiment, a wireless device may receive a control message from a first base station. The control message may comprise an identifier for each carrier in the plurality of carriers, information identifying a carrier type for each carrier in the plurality of carriers, and information associating one non-backward compatible carrier or each non-backward compatible carrier in the at least one non-backward compatible carrier with a backward compatible carrier in the at least one backward compatible carrier. The plurality of carriers may comprise at least one backward compatible carrier, and at least one non-backward compatible carrier. Common reference signal overhead of each of the at least one non-backward compatible carrier is lower than common reference signal overhead of each of the at least one backward compatible carrier. The carrier type may be one of backward compatible and non-backward compatible. The wireless device may transmit channel state information of one of the at least one non-backward compatible carrier to the first base station on an uplink carrier associated with one of the at least one backward compatible carrier. The one non-backward compatible carrier is associated with the one backward compatible carrier.

In example embodiments, the control message may be encrypted and may be protected by an integrity header before it is transmitted. The control message may be transmitted by an RRC protocol module. The control message may further include configuration information for physical channels for the wireless device. The control message may set up or modify at least one radio bearer. The control message may modify configuration of at least one parameter of a MAC layer or a physical layer. The control message may configure at least one of a physical layer parameter, a MAC layer parameter and an RLC layer parameter. The control message may be an RRC connection reconfiguration message. Broadcast system information messages may be broadcasted on at least one of the at least one backward compatible carrier. The control message comprises radio link configuration information comprising measurement configuration. The control message may comprise radio link configuration information comprising uplink channel configuration. The control message may comprise radio link configuration information comprising handover parameters.

The base station may receive an RRC reconfiguration complete message from the wireless device. The RRC reconfiguration complete message may indicate that the control message is successfully processed by the wireless device. The RRC reconfiguration complete message may include an RRC transaction identifier. The RRC reconfiguration message and RRC reconfiguration complete message may be encrypted and may be protected by an integrity header before being transmitted. The control message may be an RRC Connection Reconfiguration message in LTE-advanced technology. The control message may modify an RRC connection. The control message may include an RRC transaction identifier. The control message may be an RRC connection set up message. The wireless device may transmit a response message after it receives the control message. The response message may include a preferred PLMN ID.

The control message may configure the signal quality metric that the wireless device measures. The control message may configure measurement reporting criteria. The control message may configure cross carrier scheduling configuration. The cross carrier scheduling configuration may associate one non-backward compatible carrier in the at least one non-backward compatible carrier with a backward compatible carrier in the at least one backward compatible carrier.

The control message may comprise physical channel configuration, the physical channel configuration may comprise cross carrier scheduling configuration. The control message may comprise radio resource configuration. The radio resource configuration may comprise physical channel configuration. The carrier identifier may a carrier index. There may be multiple alternatives for reference signal transmission. The common reference signal may not transmitted on the at least one non-backward compatible carrier. The common reference signal may be transmitted in a pre-configured subset of the subframes on the at least one non-backward compatible carrier. The common reference signal may be transmitted in PDCCH radio resource on the at least one non-backward compatible carrier. The common reference signal may be transmitted on the at least one non-backward compatible carrier. CSI reference signal may be transmitted on the at least one non-backward compatible carrier. CSI reference signal may be transmitted on the at least one backward compatible carrier. Demodulation reference signal may be transmitted on the at least one non-backward compatible carrier. Demodulation reference signal may be transmitted on the at least one backward compatible carrier.

The base station may transmit a plurality of control messages to the wireless device on a backward compatible carrier. The plurality of control messages may comprise scheduling information for transmission of packets on a non-backward compatible carrier associated with the backward compatible carrier. The base station may transmit a plurality of packets to the wireless device on the non-backward compatible carrier according to the scheduling information.

The plurality of control messages may be PDCCH control messages. One of the at least one backward compatible carrier may be a primary cell carrier for the wireless device. The channel state information may comprise at least CQI information, and/or rank indicator information, and/or pre-coding matrix indicator information. The format of the channel state information may be configured by the control message.

In an example embodiment, base stations in a wireless network may be directly or indirectly connected to each other to exchange signaling and data packets. This interface in LTE and LTE-Advanced is called X2 interface. The X2 user plane interface (X2-U) may be defined between base stations. The X2-U interface may provide non-guaranteed delivery of user plane PDUs. The transport network layer is built on IP transport and GTP-U is used on top of UDP/IP to carry the user plane PDUs. The X2 control plane interface (X2-CP) may be defined between two neighbor base stations. The transport network layer may be built on SCTP on top of IP. The application layer signaling protocol may be referred to as X2-AP (X2 Application Protocol). A single SCTP association per X2-C interface instance may be used with one pair of stream identifiers for X2-C common procedures. Only a few pairs of stream identifiers may be used for X2-C dedicated procedures. The list of functions on interface between the base stations may include the following: mobility support, load management, inter-cell interference coordination, and data exchange.

In order to establish an association between two base stations, a first base station sends a first message to a second base station to initiate an association between two endpoints. The first initiation message may comprise the following parameters: Initiate Tag, Advertised Receiver Window Credit, Number of Outbound Streams, Number of Inbound Streams, and an Initial Transmit Sequence Number.

Initiation Tag may be a 32-bits unsigned integer. The receiver of the initiation message (the responding end) may record the value of the Initiate Tag parameter. This value may be placed into the Verification Tag field of every SCTP packet that the receiver of the initiation message transmits within this association. The Initiation Tag may be allowed to have any value except 0.

Advertised Receiver Window Credit may be 32-bits unsigned integer. This value may represent the dedicated buffer space, in number of bytes, the sender of the initiation message may be reserved in association with this window. During the life of the association, this buffer space may not be lessened (i.e., dedicated buffers taken away from this association); however, an endpoint may change the value of window credit it sends in a packet. Number of Outbound Streams may be 16 bits unsigned integer. It may define the number of outbound streams the sender of this initiation message wishes to create in this association. Number of Inbound Streams may be 16 bits unsigned integer. It may define the maximum number of streams the sender of this initiation message may allow the peer end to create in this association. There may be no negotiation of the actual number of streams but instead the two endpoints may use the min(requested, offered). Initial Transmit sequence number may be 32-bits unsigned integer. It may define the initial transmit sequence number that the sender may use. This field may be set to the value of the Initiate Tag field.

The second base station transmits an initiation acknowledgement message to acknowledge the initiation of an SCTP association with the first base station. The parameter part of the initiation acknowledgement message may be formatted similarly to the initiation message. It may use two extra variable parameters: The State Cookie and the Unrecognized Parameter. Initiate Tag may be a 32-bits unsigned integer. The receiver of the initiation acknowledgement message may record the value of the Initiate Tag parameter. This value may be placed into the Verification Tag field of every SCTP packet that the initiation acknowledgement message receiver transmits within this association. Advertised Receiver Window Credit may be a 32-bits unsigned integer. This value may represent the dedicated buffer space, in number of bytes, the sender of the initiation acknowledgement message has reserved in association with this window. During the life of the association, this buffer space may not be lessened (i.e., dedicated buffers taken away from this association).

Number of Outbound Streams may be 16-bits unsigned integer. It may define the number of outbound streams the sender of this initiation acknowledgement message wishes to create in this association. Number of Inbound Streams may be a 16-bits unsigned integer. It may define the maximum number of streams the sender of this initiation acknowledgement message allows the peer end to create in this association. There may not be negotiation of the actual number of streams but instead the two endpoints will use the min(requested, offered). Initial Transmit Sequence Number (TSN) may be a 32-bits unsigned integer. It defines the initial TSN that the initiation acknowledgement message sender may use. This field may be set to the value of the Initiate Tag field. The state cookie parameter may contain the needed state and parameter information required for the sender of this initiation acknowledgement message to create the association, along with a Message Authentication Code (MAC). Unrecognized Parameter may be returned to the originator of the initiation message when the initiation message contains an unrecognized parameter that has a value that indicates it should be reported to the sender. This parameter value field may contain unrecognized parameters copied from the initiation message complete with Parameter Type, Length, and Value fields.

When sending an initiation acknowledgement message as a response to an initiation message, the sender of initiation acknowledgement message may create a State Cookie and sends it in the State Cookie parameter of the initiation acknowledgement message. Inside this State Cookie, the sender may include a message authentication code, a timestamp on when the State Cookie is created, and the lifespan of the State Cookie, along with the information needed for it to establish the association. The following steps may be taken to generate the State Cookie: 1) Create an association transmission control block (TCB) using information from both the received initiation and the outgoing initiation acknowledgement messages, 2) In the TCB, set the creation time to the current time of day, and the lifespan to the protocol parameter to a pre-determined number, 3) From the TCB, identify and collect the minimal subset of information needed to re-create the TCB, and generate a MAC using this subset of information and a secret key, and 4) Generate the State Cookie by combining this subset of information and the resultant MAC.

After sending the initiation acknowledgement with the State Cookie parameter, the sender may delete the TCB and any other local resource related to the new association, so as to prevent resource attacks. The hashing method used to generate the MAC is strictly a private matter for the receiver of the initiation message. The use of a MAC is used to prevent denial-of-service attacks. The secret key may be random. It may be changed reasonably frequently, and the timestamp in the State Cookie may be used to determine which key should be used to verify the MAC. An implementation may make the cookie as small as possible to ensure interoperability.

The first base station may transmit at least one third message to the second base station. One of the at least one third message may be cookie-echo message. The cookie-echo message may be used during the initialization of an association. It may be sent by the initiator of an association to its peer to complete the initialization process. This message may precede any transport packet message sent within the association, but may be bundled with one or more data transport packet in the same packet. This message may contain the exact cookie received in the State Cookie parameter from the previous initiation acknowledgement message. The type and flags of the cookie-echo may be different than the cookie parameter. An implementation may make the cookie as small as possible to ensure interoperability. A Cookie Echo may not contain a State Cookie parameter, instead, the data within the State Cookie's Parameter Value becomes the data within the Cookie Echo's Chunk Value. This may allow an implementation to change only the first 2 bytes of the State Cookie parameter to become a cookie echo message. The first base station may transmit at least one application protocol message in cookie echo message. Or the base station may choose to transmit application protocol messages after the association is complete and do not include application protocol messages in cookie-echo message. This is an implementation option.

The application protocol message may receive a cookie-ack message from the second base station. This message may be used only during the initialization of an association. It may be used to acknowledge the receipt of a cookie-echo message. This message may precede any data sent within the association, but may be bundled with one or more data packets in the same SCTP packet. The second base station may transmit at least one application protocol message in cookie ack message. Or the base station may choose to transmit application protocol messages after the association is complete and may not include application protocol messages in cookie-ack message. This may be an implementation option.

After the initiation and initiation acknowledgement messages are transmitted, the first base station or the second base station may transmit an X2 setup message to set up an X2 application interface. The first base station or the second base station may wait until the association is complete to set up an X2 application interface. Either first base station or second base station may start the set up of an X2 application. The purpose of the X2 Setup procedure may be to exchange application level configuration data needed for two base stations to interoperate correctly over the X2 interface. This procedure may erase any existing application level configuration data in the two nodes and replace it by the one received. This procedure may also reset the X2 interface like a reset procedure would do.

A first base station or second base station may initiate the procedure by sending the X2 set up request message to a candidate base station. The candidate base station may reply with the X2 set up response message. The initiating base station may transfer the list of served cells. The candidate base station may reply with the complete list of its served cells in the reply.

The X2 set up request message may include the following information about the originator of the message: a global base station identifier, the information about the served cells, and a GU group identifier list. GU Group identifier list is the pools to which the base station belongs to. Each row in this list may include the PLMN ID and MME group Identifier. The information about each served cell may include information about the served cell configurations. It may also include the list of neighbor cells of the served cell including: Cell Global Identifier of the neighbor cell, Physical Cell Identifier of the neighbor cell, frequency. The served cell information may include at least one of the following parameters: Physical Cell ID, global cell identifier, Tracking Area Code, at least one Broadcast PLMN, FDD information (uplink and downlink frequencies, uplink and downlink transmission bandwidth), TDD information (transmission frequency, subframe assignment, special subframe information, special subframe pattern, cyclic prefix for downlink and uplink), number of antenna ports, PRACH Configuration, MB SFN Subframe Info (Radio frame Allocation Period, Radio frame Allocation Offset, Subframe Allocation), and CSG identifier. The X2 set up request message may also include information identifying the served cell downlink or/and uplink carrier type. This information may be included explicitly or implicitly in the served cell configuration. The carrier type here may be a first, second, or third carrier type. For example, carrier type may be broadly identified as backward compatible carrier and non-backward compatible carriers. In other example embodiment, the categorization may be different. Each served cell includes a downlink carrier. The carrier types may be called using various names such as data carriers, data cells, control carriers, control cells, primary cells, primary carriers, secondary cells, secondary carriers, or other example names. Each cell includes a downlink carrier and may or may not include an uplink carrier. A cell type may implicitly indicate a carrier type in the example embodiments. The backward compatible and non-backward compatible are functional characteristics of the carriers and may not be reflected in the carrier types names. The carrier type may not be explicitly indicated in the messages, but this information may be implicitly obtained from the messages. For example, an X2 set up request, may identify cell types A, B, C, and D. Cell type A, B, and C may include backward compatible carrier(s), and cell type D may include non-backward compatible carrier(s). The information about which carrier is backward compatible and which carrier is not backward compatible is implicitly determined based on the definition of cell types A, B, C, and D. For example, a backward compatible carrier may be used by all wireless devices of release 11 and beyond. But a non-backward compatible carrier may be used by wireless devices of release 12 and beyond. Another example of carrier types may be synchronized carrier, segment carrier, non-synchronized new carrier type (NCT), standalone NCT, non-standalone NCT, and/or the like.

X2 set up response messages may include most or all of the fields of the X2 set up request message characterizing the base station that is transmitting the message. After two base stations exchange X2 set up request and response message, each base station may be aware of the other base station configurations including information about its serving cells. This information may be used to perform various functions performed by X2 interface including handover signaling and management, load management, and interference coordination.

In an example embodiment, a first base station comprises a communication interface, a processor, and a memory storing instructions that, when executed, cause the first base station to perform certain functions. The base station may receive a second application protocol message from a second base station in the plurality of base stations. The second application protocol message may comprise a unique identifier of the second base station, cell identifier for each of the at least one backward compatible carrier, and information identifying a carrier type for each carrier in the plurality of carriers. The second base station may comprise a plurality of carriers comprising at least one backward compatible carrier, and at least one non-backward compatible carrier. The carrier type may be one of backward compatible and non-backward compatible. The information in the application protocol messages may be employed, at least in part, when the base stations are communicating with other. For example, a base station may make a handover decision. The first base station may operate a wireless device handover based, at least in part, on information in the second application protocol message. Handover signaling and messages may employ at least in part the information in the application protocols (e.g. setup message and setup response message).

In an example embodiment, a first base station may receive a second application protocol message from a second base station. The second application protocol message may comprise a unique identifier of the second base station, cell identifier for each of the at least one first type carrier, and information identifying a carrier type for each carrier in said plurality of carriers. The second base station comprises a plurality of carriers comprising at least one first type carrier, and at least one second type carrier. The carrier type may be one of first type and second type. The base station may operate a wireless device handover based, at least in part, on information in the second application protocol message.

In another example embodiment, a first base station may receive a second application protocol message from a second base station in the plurality of base stations. The second application protocol message may comprise a unique identifier of the second base station, at least one MME group identifier, cell identifier for each of the at least one backward compatible carrier, and information identifying a carrier type for each carrier in the plurality of carriers. The second base station may comprise a plurality of carriers comprising at least one backward compatible carrier, and at least one non-backward compatible carrier. Common reference signal overhead of each of the at least one non-backward compatible carrier may be lower than common reference signal overhead of each of the at least one backward compatible carrier. The carrier type may be one of backward compatible and non-backward compatible. The first base station may operate a wireless device handover based, at least in part, on information in the second application protocol message.

In another example embodiment, a first base station may transmit a first message to initiate an association between the first base station and a second base station in the plurality of base stations. The first message may comprise a first initiation tag. The first base station may receive a second message from the second base station. The second message may comprise a second verification tag, a second initiation tag, and a first state parameter. The second verification tag may be equal to the first initiation tag. A first state parameter may comprise at least one parameter related to operational information of the association, and a message authentication code generated as a function of a private key. The first base station may transmit at least one third message to the second base station. The at least one third message may comprise a first verification tag, and a parameter comprising the first state parameter. The first verification tag may be equal to the second initiation tag. The first base station may receive at least one fourth message from the second base station. The at least one fourth message may comprise an acknowledgement for the receipt of the parameter and a second application protocol message. The second application protocol message may comprise a unique identifier of the second base station, at least one MME group identifier, cell identifier for each of the at least one backward compatible carrier, and information identifying a carrier type for each carrier in the plurality of carriers. The second base station may comprise a plurality of carriers comprising at least one backward compatible carrier and at least one non-backward compatible carrier. Common reference signal overhead of each of the at least one non-backward compatible carrier may be lower than common reference signal overhead of each of the at least one backward compatible carrier. The carrier type may be one of backward compatible and non-backward compatible. The first base station may operate a wireless device handover using the association and based, at least in part, on information in the at least one fourth message.

In example embodiments, the first initiation tag value may be a selected in the first base station using a pseudo-random process. The second initiation tag value may be selected in the second base station using a pseudo-random process. The first message may further comprise a first base station transport address and a second base station transport address. The first message may further comprise a first advertised receiver window credit representing a dedicated buffer space that the first base station reserves for a window of received packets from the second base station. The first message may further comprise a first initial transmission sequence number that the first base station uses for transmission of data segments. The first initial transmission sequence number may be equal to the first initiation tag.

The second message may further comprise the first base station transport address and the second base station transport address. The second message may further comprise a second advertised receiver window credit representing a dedicated buffer space that the second base station reserves for a window of received packets from the first base station. The second message may further comprise a second initial transmission sequence number that the second base station uses for transmission of data chunks. The second initial transmission sequence number may be equal to the second initiation tag. The at least one third message may further comprise the first base station transport address and the second base station transport address. The at least one third message may further comprise a transmit sequence number, a stream identifier, a stream sequence number.

The at least one fourth message may further comprise a transmit sequence number, a stream identifier, and a stream sequence number. The second base station may place the first initiation tag in the verification tag of every transport layer packet that it transmits to the first base station within the association. The first base station may place the second initiation tag in the verification tag of every SCTP packet that it transmits to the second base station within the association. The association may be an SCTP association. The at least one fourth message may further comprise the first base station transport address and the second base station transport address. The second application protocol message may be an X2-Application Protocol Setup Request message. The second application protocol message may be an X2-Application Protocol Setup Response message. The at least one third message may further comprise an X2-Application Protocol Setup Request message. The at least one third message may further comprise an X2-Application Protocol Setup Response message.

The first state parameter may further comprise a timestamp on when the first state parameter is created. The first state parameter may further comprise the lifespan of the first state parameter. The message authentication code may further be a function of at least one parameter related to operational information of the association. The at least one third message may further comprise a first application protocol message. The first application protocol message may comprise a unique identifier of the first base station, at least one MME group identifier, cell identifier for each of the at least one backward compatible carrier, information identifying a carrier type for each carrier in the plurality of carriers. The first base station may comprise a plurality of carriers comprising at least one backward compatible carrier and at least one non-backward compatible carrier. The carrier type may be one of backward compatible and non-backward compatible.

The first verification tag and the second verification tag in the association may not change during the life time of the association. A new verification tag value may be used each time the first base station or the second base station tears down and then reestablishes an association with the same node. The operational information comprises at least one of the following: a parameter in the first message, a parameter in the second message, a state of the association, a configuration parameter of the first base station, and a configuration parameter of the second base station. The first message and the second message may further comprise a checksum for packet validation. The first base station transport address and the second base station transport address may comprise an IP address and a port address. The second application protocol message may further comprise cell identifier for each of the at least one non-backward compatible carrier.

The second application protocol message may further comprise information identifying for each of the at least one non-backward compatible carrier, a corresponding backward compatible carrier.

There are various alternative options for transmitting reference signal on downlink carriers. The at least one backward compatible carrier may broadcast a common cell reference signal and the at least one non-backward compatible carrier may not broadcast the common cell reference signal. The common reference signal may not be transmitted on the at least one non-backward compatible carrier. The common reference signal may be transmitted in a preconfigured subset of the subframes on the at least one non-backward compatible carrier. The common reference signal may be transmitted in PDCCH radio resource on the at least one non-backward compatible carrier. The common reference signal may be transmitted on the at least one non-backward compatible carrier. CSI reference signal may be transmitted on the at least one non-backward compatible carrier. CSI reference signal may be transmitted on the at least one backward compatible carrier. Demodulation reference signal may be transmitted on the at least one non-backward compatible carrier. Demodulation reference signal may be transmitted on the at least one backward compatible carrier.

The first message may further comprise a first number of outbound streams that the first base station intend to create and a first maximum number of inbound streams that the first base station allows the second base station to create. The second message may further comprise a second number of outband streams that the second base station intend to create, a second maximum number of inbound streams the second base station allows the first base station to create. The second number of outband streams is smaller than or equal to the first maximum number of inbound streams. The first base station may further select a number equal or lower than the minimum of the first number of outband streams and the second maximum number of inbound streams as the number of outband streams for the first base station.

A new downlink carrier type for carrier aggregation may be introduced. Such a carrier may not be initially defined for standalone operation. The UL PCC may contain the PUCCH. The UL SCC linked to (by fixed duplex distance in FDD) the new DL SCC type may not have any PUCCH region. In Rel-10, the PCell configuration may be UE-specific which may be beneficial, e.g., to balance the load among the serving cells in the eNodeB. It may be possible that an UL CC has a PUCCH for some UE. With the new downlink carrier type, this may be achieved and the consequence of the new downlink carrier type is that the associated UL CC may be a PUCCH-less carrier. A new DL carrier type may improve the spectral efficiency. The extra RBs previously being used for the PUCCH may be available for PUSCH transmission in the associated UL CC. A requirement for spectrally efficient PUSCH transmission may be that the eNodeB may have the means to leverage on the frequency selectivity of the channel for the scheduling and link adaptation, which may be used in case of carrier aggregation, where the link conditions may be good and localized transmissions may be preferred. The PUCCH-less carrier may not be an UL PCC and thus may carry transmissions from UEs being configured with UL carrier aggregation. Those UEs may not be power limited and the UL link conditions may be expected to be favorable.

An ePDCCH may be configured for legacy carriers and/or new type carriers. An ePDCCH may allow frequency domain scheduling and beam forming gains for control signaling without increasing the RS overhead. Cross carrier scheduling may or may not be used for scheduling the new carrier type using legacy or ePDCCH.

The new type carrier may be associated with a backward compatible carrier. In one example implementation, the new carrier may not exist as stand-alone and may exist as an SCell by carrier aggregation with a backward compatible carrier. The new type carrier itself may be a component carrier in the perspective of the carrier aggregation. The PDSCH in the new type carrier may be scheduled independently from the other aggregated carriers with independent HARQ processes. In an example embodiment, regarding RB allocation algorithms for the PDSCH in the new type carrier, legacy RB allocation algorithms may be used. In the new type carrier, PDSCH may be scheduled independently from the other aggregated carriers with independent HARQ processes. PDSCH in the new type carrier may be cross-carrier scheduled by the other aggregated carrier. E-PDCCH may be supported in the new type carrier, PDSCH in the new type carrier may be scheduled by E-PDCCH in the new type carrier itself.

In case of the cross-carrier scheduling in Rel-10 carrier aggregation, PDSCH starting position of an SCell may be RRC-signaled to the UE. Even though the new type carrier may not transmit PDCCHs in its starting OFDM symbol(s) in a subframe, the eNB may configure the starting OFDM symbol(s) in a subframe of the new type carrier in order to blank some of OFDM symbols for the purpose of interference coordination, for example, in some HetNet scenarios where one cell uses legacy PDCCH and another cell does ePDCCH. Therefore, ePDCCH and PDSCH starting position of a new type carrier may be RRC signaled to the UE. The new type carrier may not carry the legacy PDCCH signals, the RRC signaling may be able to indicate the very first OFDM symbol (ie. value 0) in a subframe as the PDSCH starting position. Legacy PDCCH may not be present on the new carrier, the scheduling may be done through one of the following two ways: a) Cross-carrier scheduling from the associated backward-compatible carrier: this may raise some concern on the PDCCH capacity on the associated carrier. b) ePDCCH: ePDCCH may be used on the new carrier type so as to improve the PDCCH capacity and provide interference coordination on the control channel. It may alleviate the capacity issue on the associated carrier compared to the previous option.

If cross-carrier scheduling is used, there may be no need for PHICH (and PCFICH) on the new carrier, because the HARQ-ACK feedback may be sent on the associated backward-compatible carrier. If ePDCCH is used, the legacy PHICH may be used on the carrier, or a new design may be needed for PHICH in order to achieve similar interference coordination capability on the frequency domain for PHICH. The PCFICH information may be provided semi-statically for cross-carrier scheduling cases.

A new carrier type may give the eNodeB larger flexibility in controlling the effective bandwidth of the carrier. An ePDCCH with FDM extension in the PDSCH region that may be located on the new carrier and that its resources would be configurable by the eNodeB. Other control channels may reside on the legacy carrier. Still, the other control channels (PCFICH, PHICH) or their enhancements may become needed on the new carrier, at least eventually if the carrier supports stand-alone operation.

The frequency resources used for the control channels may be configurable. For example, if a carrier contains a control region in the beginning OFDM symbols of the subframe, similar to a legacy carrier, such a control region may be configurable in its frequency resource occupancy (RBs, DVRBs etc.). The additional downlink carrier type may have means for controlling the frequency resources of its control channels.

One way to improve the spectral efficiency may be to reduce the PDCCH overhead. The overhead of the downlink may be reduced with some form of joint encoding of information fields in the PDCCHs associated with the legacy carrier and the new carrier type. For example, the main savings may be due to using 1 CRC, no carrier indicator field and 1 HARQ process ID. The other information fields may be duplicated for the two carriers. The additional carrier type may be deployed to fill out spectrum that may not commensurate with the Rel-8 channel bandwidths. Such allocations may be contiguous frequency blocks with bandwidths below 20 MHz. A scenario may be when the additional carrier type is contiguously deployed next to the legacy carrier. In that situation, the overhead may be significantly reduced by joint encoding but not duplicating any information fields.

In an example embodiment, a network may comprise a plurality of base stations. A first base station may receive at least one message from a second base station in the plurality of base stations. The second base station may comprise one or more downlink carriers, each comprising a plurality of downlink resource blocks. In another example embodiment, the first base station may receive the at least one message from an OAM providing configuration information to the first base station. The at least one message may comprise a plurality of parameters corresponding to a physical downlink control channel resource configuration information. The plurality of parameters for example may comprise: one or more frequency resource parameters in terms of resource blocks and/or one or more subframe parameters identifying a subset of subframes.

If the at least one message is received from the second base station, the plurality of parameters may provide information about radio resources that may be used by ePDCCH of a cell in the second base station. In other word, ePDCCH of the cell may employ a subset of radio resources identified by the at least one message. The second base station may provide this information for each of its cells. In another embodiment, the second base station may provide this information for a subset of its cells. In another embodiment, this information may be included as cell parameters in the application protocol message for each cell or cells with a configured ePDCCH. Alternatively, it may be provided in an information element and may be applicable to cells that may be potentially configured with ePDCCH.

If the at least one message is received from the OAM, the plurality of parameters may provide information about radio resources that may be used by ePDCCH of a cell in the first base station receiving the message from OAM. In other word, ePDCCH of the cell may employ a subset of radio resources identified by the at least one message. The OAM may provide this information for each of the first base station cells. In another embodiment, the OAM may provide this information for a subset of cells. In another embodiment, this information may be included as cell parameters in the message for each cell or cells with a configured ePDCCH. Alternatively, it may be provided in an information element and may be applicable to cells that may be potentially configured with ePDCCH.

According to some aspect of an example embodiment, one or more frequency resource parameters in terms of resource blocks may be provided in the form of a bitmap indicating the resource blocks employed or employable to ePDCCH. For example, a bitmap with the length of 110 bits may indicate which of the resource blocks in a 110 bits resource blocks of a cell may be allocated to ePDCCH. In another example, one or more frequency resource parameters may be provided in in the form of a set of pre-defined indexes (each index identifying a pre-defined set of resource blocks), or a list of at least one (starting offset, bandwidth). In another example embodiment the message may provide ePDCCH configuration parameters that may be configured for UEs, according the ePDCCH configuration parameters in the RRC messages (RRC ePDCCH configuration parameters are disclosed in this specification).

The plurality of parameters may comprise a starting time in subframes of a cell or a subset of subframes of the cell. The plurality of parameters for example may comprise beamforming information for ePDCCH for example codebook information, codebook index information, and/or the like. The plurality of parameters may comprise one or more subframe parameters for example one or more subframe parameters identifying a subset of subframes. For example, in the form of a bitmap with length 20, 40, 70 for a cell. The bitmap may indicate which subframe of a cell may include ePDCCH resources. The plurality of parameters may indicate radio resources that aggregated ePDCCH radio resources of a cell for UEs may use in the second base station.

In an example embodiment, the message(s) may be application protocol message(s) received from a second base station by the first base station. The message(s) provide ePDCCH radio resource configuration of the cell(s) of the second base station to the first base station. The base station may receive ePDCCH configuration parameters from neighboring base station(s). The application protocol message for example may be a setup message, a setup response message, eNB configuration update, eNB configuration update ACK, a load information message, and/or an invoke message. The setup and setup response messages may be transmitted when the X2 connection is set up at the application protocol level. The load message may transmitted regularly, periodically, and/or when needed. ePDCCH radio resource configuration parameters may be provided along with other cell parameters in the application protocol message for each cell. For example, a setup or setup response message may optionally provide this information for a cell (carrier) along with other cell parameters as indicated in this disclosure. In another example, the load message may include this information along with other information of a cell such as Cell ID, UL Interference Overload Indication, Relative Narrowband Tx Power (RNTP), ABS Information, Invoke Indication, and/or the like. A load information message may optionally include some of these parameters and may optionally include ePDCCH radio resource parameters for a cell.

In an example embodiment, the message(s) may be received from OAM. The messages may provide radio resources applicable for ePDCCH of cells of the first base station. In other word, the base station may configure ePDCCH of cells within the radio resources provided by OAM.

The first base station may transmit at least one RRC message to configure ePDCCH resources for at least one of the cells of the first base station. In an example embodiment, the configuration parameters of ePDCCH may be within the range of radio resources identified by OAM message. In an example embodiment, the configuration parameters of ePDCCH may be configured so that ePDCCH of the first base station may not overlap (or may have reduced overlap) with neighboring base station(s) ePDCCH radio resources. The neighboring base station may be an interference aggressor base station. This configuration may reduce interference on ePDCCH. A base station receiving ePDCCH resources that is potentially employed for ePDCCH configuration in neighboring cells, may configure ePDCCH resources of its cells to reduce inter-cell interference on ePDCCH. In an example embodiment, an aggressor cell may provide ePDCCH resources of its cells to victim base stations. Victim base stations may use this information in configuring ePDCCH resources.

The first base station may select at least one transmission parameter of a first downlink control channel (for example ePDCCH) and/or a first downlink data channel of the downlink carrier of the first base station. The selection may be based, at least in part, on physical downlink control channel resource configuration information received from another base station or from OAM. The first base station may transmit scheduling packets on the first downlink control channel. The scheduling packets may comprise scheduling information for packets transmitted on the first downlink data channel. In an example embodiment, the selection is performed to reduce inter-cell interference. In an example, the selection is performed to reduce overlap of radio resources between the first downlink control channel (first ePDCCH) and the second downlink control channel of a neighboring base station (second ePDCCH of for example the second base station). The selection may be performed to reduce and/or eliminate the overlap of ePDCCH resources between two cells of base stations below a threshold.

The first base station may transmit a packet comprising acknowledgement for the receipt of the at least one message. The second physical downlink control channel may be ePDCCH and may carry scheduling information for packets transmitted on a downlink shared channel and/or an uplink shared channel. The second physical downlink control channel may carry power control commands for wireless devices transmitting uplink on an up shared channels.

According with an aspect of the disclosed embodiments, RNTP included in the Load Information message may be used to exchange information about transmit power for Physical Resource Blocks (PRBs) used for data channels, in order to assist carrier selection for users strongly interfered by macro cell. RNTP reporting mechanisms may enable an first eNB to indicate to another eNB the RNTP threshold the first eNB may prefer to receive a report on physical resource block powers. For example, the first eNB may send the recommended transmit power and/or expected power reduction to another eNB, to achieve protected resources. In another example, the first eNB may indicate to another eNB to increase or decrease the used RNTP threshold.

Support of frequency-domain ICIC may require some ePDCCH configuration information exchange between two base stations X2 interface. This may allow configuring ePDCCH (specially for victim eNBs) in frequency resource with low interference. Information exchange between two eNBs may be needed for the case where ePDCCH transmission in the victim cell needs to be protected from the interference caused by the aggressor cell. An ePDCCH configuration is performed by RRC layer semi-statically. It is expected that eNB does not change ePDCCH configuration frequently for example every frame or a couple of frames. The aggressor eNB may indicate the victim cell of the set of resources in which the victim cell can expect low inter-cell interference or high inter-cell interference. The victim cell may employ this information in configuring downlink channels in a way that it uses low interference resource blocks and reduces high interference resource blocks. LTE system may employ Relative Narrowband Tx Power for frequency-domain ICIC of PDSCH. By RNTP message, the aggressor eNB may indicate that set of PRBs in which its DL transmission power will be kept below a threshold for a cell.

RNTP may be employed to reduce interference in ePDCCH radio resources. RNTP for a cell may be in the form of a bitmap. Each position in the bitmap may represent a nPRB value (i.e. first bit=PRB 0 and so on), for which the bit value represents RNTP (nPRB). Value 0 may indicate "Tx not exceeding RNTP threshold" and Value 1 may indicates "no promise on the Tx power is given". RNTP threshold may be included in the same message. The message may also include Number Of Cell-specific Antenna Ports for cell specific reference signals. The victim may transmits ePDCCH on the PRBs for which the aggressor cell may transmit a DL transmission power lower than RNTP threshold. In an example embodiment, a base station may employ RNTP information received from the neighboring base stations to configure ePDCCH for the UEs in the coverage area. A base station may configure ePDCCH resources in RBs that aggressor base station may not transmit power higher than RNTP. This may reduce interference on ePDCCH resources of a cell.

In another example embodiment, an information element may be specifically defined for indicating of PRBs with low transmission power for the purpose of ePDCCH ICIC. In this information element, eNB may indicate a bitmap determining resource blocks that may not be used in a semi-static fashion by an eNB. The victim eNB may use that information for ePDCCH configuration. The aggressor cell eNB may send, for example a bitmap as a subset of RNTP, such that the PRBs indicated by this bitmap may remain as the low-power resource in a semi-static manner. This information may be used for ePDCCH configuration. In another example embodiment, RNTP bitmap may be extended to include both legacy RNTP information and also information of resource blocks that may remain below a power threshold in semi-static basis. RNTP may include an information element for each resource block. A first value of the resource block may determine that the resource block may be at low power for a longer duration (semi-static configuration) and a second value may indicate that the RNTP has low or high power. Victim base station may use the semi-static information for ePDCCH configuration.

According with an aspect of the disclosed embodiments, providing inter-eNB assistance may be beneficial to enhance the selection of resources protected from interference, while mitigating interference with available ICIC mechanisms for those users. An eNB may inform neighbour eNBs about DL interference problems on a carrier X, both in data and control regions, and exchanges the information about Pcell vs. SCell carrier loading. The neighbour eNB may use this information when deciding on the assignment of a UE PCell and SCell(s), to achieve resource protection: in reaction to high DL interference indication, eNB s may allocate users' PCells of UE to different carriers and reallocations may be limited to SCell reconfigurations. Upon receiving the indication of interference problems, the peer eNB may for example reduce the number of users using carrier X (e.g. by de-activating SCells on carrier X), or reduce the transmission power on carrier X, to mitigate interference in the data region, as well as may reduce its transmission power for the control channel region on carrier X (e.g. using cross-carrier scheduling for carrier X, such that PDCCH scheduling grants for carrier X are send from other carriers). Knowing in addition the loading in terms of Pcell and Scell may provide information to an eNB to decide on the assignment of a UE PCell and SCell(s), e.g. when neighbour cells mainly use carrier 1 for PCell, the eNB can select carrier 1 more for SCell of its users, which allows a quick deactivation.

According with an aspect of the disclosed embodiments, neighbouring base station may exchange information about Pcell vs. SCell carrier loading over X2, interference indication for data channels over X2, and/or interference indication for control channels over X2 interface. The indication about data interference problem on a given carrier may be a single binary message, or may provide higher level of granularity to indicate more information on the data channel interference problems. If the peer eNB for some reasons is not able to take actions for reducing the interference on carrier X, it may inform the initiating eNB about the problem. The PCell/SCell carrier load may be implemented as an extension of the Resource Status Report Initiation and Resource Status Report procedures, e.g. in a form of number of users for whom the carrier is PCell or SCell. DL control channel interference on a given carrier may be estimated based on existing mechanisms (no impact on the UE). For example, an eNB may consider a UE is suffering high DL interference in control channels in case it does not respond in large ratio as expected to control information, like scheduling grants. The controlling eNB can take this into account and exchange the information, if requested, with its neighbours to improve the PCell and SCell selection.

According with an aspect of the disclosed embodiments, radio channel resources may be preconfigured in a way among macro and pico cells to properly coordinate for carrier-based ICIC. The neighbour eNB may use this information when deciding on the assignment of a UE PCell and SCell(s) for users suffering from strong macro interference in a proactive manner. So for example if there are two carriers, one of which protected from interference, that carrier can be selected as Pcell in the pico cell to convey scheduling information and data to users suffering from strong interference from macro, while the other carrier may be used as Scell for the same users by the pico. OAM may provide the configuration for protected PDCCH carrier component(s) to involved eNB s.

According with an aspect of the disclosed embodiments, the information about the configuration of protected resources may be exchanged between eNB s over X2 interface, aiming for a consistent configuration to properly coordinate for carrier-based ICIC. The neighbour eNB may use this information when deciding on the assignment of a UE PCell and SCell(s) for users suffering from macro interference. So for example if there are two carriers, one of which protected from interference, that carrier can be selected as Pcell in the pico cell to convey scheduling information and data to users suffering from strong interference from macro, while the other carrier can be used as Scell for the same users by the pico. The macro eNB may request to report loading status information to monitor and further tune the power allocation of the protected resources. The eNB needing assistance can send an Invoke Indication to the assisting node to receive information about allocated resources in the frequency domain.

According with an aspect of the disclosed embodiments, information about the configuration of protected PDCCH carrier component(s) may be exchanged among eNBs. Protected PDCCH carrier component(s) may be chosen by eNB(s) and information is exchanged via X2 whenever the cross-carrier scheduling is enabled. PCell and SCell information may be exchanged between base stations. In another example embodiment, OAM may provide protected PDCCH carrier component(s) preference list to each eNB, and/or ePDCCH information to the eNB. The eNB may choose PDCCH CC(s) or ePDCCH configuration parameters according to received parameters. An eNB may exchange the information through X2, for example, whenever the cross-carrier scheduling is enabled or whenever ePDCCH is configured. In an example embodiment, the set for protected carrier component(s) may configured in the macro and signalled via the X2 interface to the pico. Whenever cross scheduling is used to convey scheduling information to user strongly interfered by macro cell, the pico may configure UE Pcell from this protected set.

According to some of the various aspects of embodiments, the packets in the downlink may be transmitted via downlink physical channels. The carrying packets in the uplink may be transmitted via uplink physical channels. The baseband data representing a downlink physical channel may be defined in terms of at least one of the following actions: scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on layer(s) for transmission on the antenna port(s); mapping of complex-valued modulation symbols for antenna port(s) to resource elements; and/or generation of complex-valued time-domain OFDM signal(s) for antenna port(s).

Codeword, transmitted on the physical channel in one subframe, may be scrambled prior to modulation, resulting in a block of scrambled bits. The scrambling sequence generator may be initialized at the start of subframe(s). Codeword(s) may be modulated using QPSK, 16QAM, 64QAM, 128QAM, and/or the like resulting in a block of complex-valued modulation symbols. The complex-valued modulation symbols for codewords to be transmitted may be mapped onto one or several layers. For transmission on a single antenna port, a single layer may be used. For spatial multiplexing, the number of layers may be less than or equal to the number of antenna port(s) used for transmission of the physical channel. The case of a single codeword mapped to multiple layers may be applicable when the number of cell-specific reference signals is four or when the number of UE-specific reference signals is two or larger. For transmit diversity, there may be one codeword and the number of layers may be equal to the number of antenna port(s) used for transmission of the physical channel.

The precoder may receive a block of vectors from the layer mapping and generate a block of vectors to be mapped onto resources on the antenna port(s). Precoding for spatial multiplexing using antenna port(s) with cell-specific reference signals may be used in combination with layer mapping for spatial multiplexing. Spatial multiplexing may support two or four antenna ports and the set of antenna ports used may be {0, 1} or {0, 1, 2, 3}. Precoding for transmit diversity may be used in combination with layer mapping for transmit diversity. The precoding operation for transmit diversity may be defined for two and four antenna ports. Precoding for spatial multiplexing using antenna ports with UE-specific reference signals may also, for example, be used in combination with layer mapping for spatial multiplexing. Spatial multiplexing using antenna ports with UE-specific reference signals may support up to eight antenna ports. Reference signals may be pre-defined signals that may be used by the receiver for decoding the received physical signal, estimating the channel state, and/or other purposes.

For antenna port(s) used for transmission of the physical channel, the block of complex-valued symbols may be mapped in sequence to resource elements. In resource blocks in which UE-specific reference signals are not transmitted the PDSCH may be transmitted on the same set of antenna ports as the physical broadcast channel in the downlink (PBCH). In resource blocks in which UE-specific reference signals are transmitted, the PDSCH may be transmitted, for example, on antenna port(s) 15, {7}, {8}, or {7, 8, . . . , v+6}, where v is the number of layers used for transmission of the PDSCH.

Common reference signal(s) may be transmitted in physical antenna port(s). Common reference signal(s) may be cell-specific reference signal(s) (RS) used for demodulation and/or measurement purposes. Channel estimation accuracy using common reference signal(s) may be reasonable for demodulation (high RS density). Common reference signal(s) may be defined for LTE technologies, LTE-advanced technologies, and/or the like. Demodulation reference signal(s) may be transmitted in virtual antenna port(s) (i.e., layer or stream). Channel estimation accuracy using demodulation reference signal(s) may be reasonable within allocated time/frequency resources. Demodulation reference signal(s) may be defined for LTE-advanced technology and may not be applicable to LTE technology. Measurement reference signal(s), may also called CSI (channel state information) reference signal(s), may be transmitted in physical antenna port(s) or virtualized antenna port(s). Measurement reference signal(s) may be Cell-specific RS used for measurement purposes. Channel estimation accuracy may be relatively lower than demodulation RS. CSI reference signal(s) may be defined for LTE-advanced technology and may not be applicable to LTE technology.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

Element(s) in a resource grid may be called a resource element. A physical resource block may be defined as N consecutive SC-FDMA symbols in the time domain and/or M consecutive subcarriers in the frequency domain, wherein M and N may be pre-defined integer values. Physical resource block(s) in uplink(s) may comprise of M.times.N resource elements. For example, a physical resource block may correspond to one slot in the time domain and 180 kHz in the frequency domain. Baseband signal(s) representing the physical uplink shared channel may be defined in terms of: a) scrambling, b) modulation of scrambled bits to generate complex-valued symbols, c) mapping of complex-valued modulation symbols onto one or several transmission layers, d) transform precoding to generate complex-valued symbols, e) precoding of complex-valued symbols, f) mapping of precoded complex-valued symbols to resource elements, g) generation of complex-valued time-domain SC-FDMA signal(s) for antenna port(s), and/or the like.

For codeword(s), block(s) of bits may be scrambled with UE-specific scrambling sequence(s) prior to modulation, resulting in block(s) of scrambled bits. Complex-valued modulation symbols for codeword(s) to be transmitted may be mapped onto one, two, or more layers. For spatial multiplexing, layer mapping(s) may be performed according to pre-defined formula(s). The number of layers may be less than or equal to the number of antenna port(s) used for transmission of physical uplink shared channel(s). The example of a single codeword mapped to multiple layers may be applicable when the number of antenna port(s) used for PUSCH is, for example, four. For layer(s), the block of complex-valued symbols may be divided into multiple sets, each corresponding to one SC-FDMA symbol. Transform precoding may be applied. For antenna port(s) used for transmission of the PUSCH in a subframe, block(s) of complex-valued symbols may be multiplied with an amplitude scaling factor in order to conform to a required transmit power, and mapped in sequence to physical resource block(s) on antenna port(s) and assigned for transmission of PUSCH.

According to some of the various embodiments, data may arrive to the coding unit in the form of two transport blocks every transmission time interval (TTI) per UL cell. The following coding actions may be identified for transport block(s) of an uplink carrier: a) Add CRC to the transport block, b) Code block segmentation and code block CRC attachment, c) Channel coding of data and control information, d) Rate matching, e) Code block concatenation. f) Multiplexing of data and control information, g) Channel interleaver, h) Error detection may be provided on UL-SCH (uplink shared channel) transport block(s) through a Cyclic Redundancy Check (CRC), and/or the like. Transport block(s) may be used to calculate CRC parity bits. Code block(s) may be delivered to channel coding block(s). Code block(s) may be individually turbo encoded. Turbo coded block(s) may be delivered to rate matching block(s).

Physical uplink control channel(s) (PUCCH) may carry uplink control information. Simultaneous transmission of PUCCH and PUSCH from the same UE may be supported if enabled by higher layers. For a type 2 frame structure, the PUCCH may not be transmitted in the UpPTS field. PUCCH may use one resource block in each of the two slots in a subframe. Resources allocated to UE and PUCCH configuration(s) may be transmitted via control messages. PUCCH may comprise: a) positive and negative acknowledgements for data packets transmitted at least one downlink carrier, b) channel state information for at least one downlink carrier, c) scheduling request, and/or the like.

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards. Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identit(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various aspects of embodiments, the sequence used for a primary synchronization signal may be generated from a frequency-domain Zadoff-Chu sequence according to a pre-defined formula. A Zadoff-Chu root sequence index may also be predefined in a specification. The mapping of the sequence to resource elements may depend on a frame structure. The wireless device may not assume that the primary synchronization signal is transmitted on the same antenna port as any of the downlink reference signals. The wireless device may not assume that any transmission instance of the primary synchronization signal is transmitted on the same antenna port, or ports, used for any other transmission instance of the primary synchronization signal. The sequence may be mapped to the resource elements according to a predefined formula.

For FDD frame structure, a primary synchronization signal may be mapped to the last OFDM symbol in slots 0 and 10. For TDD frame structure, the primary synchronization signal may be mapped to the third OFDM symbol in subframes 1 and 6. Some of the resource elements allocated to primary or secondary synchronization signals may be reserved and not used for transmission of the primary synchronization signal.

According to some of the various aspects of embodiments, the sequence used for a secondary synchronization signal may be an interleaved concatenation of two length-31 binary sequences. The concatenated sequence may be scrambled with a scrambling sequence given by a primary synchronization signal. The combination of two length-31 sequences defining the secondary synchronization signal may differ between subframe 0 and subframe 5 according to predefined formula(s). The mapping of the sequence to resource elements may depend on the frame structure. In a subframe for FDD frame structure and in a half-frame for TDD frame structure, the same antenna port as for the primary synchronization signal may be used for the secondary synchronization signal. The sequence may be mapped to resource elements according to a predefined formula.

Example embodiments for the physical channels configuration will now be presented. Other examples may also be possible. A physical broadcast channel may be scrambled with a cell-specific sequence prior to modulation, resulting in a block of scrambled bits. PBCH may be modulated using QPSK, and/or the like. The block of complex-valued symbols for antenna port(s) may be transmitted during consecutive radio frames, for example, four consecutive radio frames. In some embodiments the PBCH data may arrive to the coding unit in the form of a one transport block every transmission time interval (TTI) of 40 ms. The following coding actions may be identified. Add CRC to the transport block, channel coding, and rate matching. Error detection may be provided on PBCH transport blocks through a Cyclic Redundancy Check (CRC). The transport block may be used to calculate the CRC parity bits. The parity bits may be computed and attached to the BCH (broadcast channel) transport block. After the attachment, the CRC bits may be scrambled according to the transmitter transmit antenna configuration. Information bits may be delivered to the channel coding block and they may be tail biting convolutionally encoded. A tail biting convolutionally coded block may be delivered to the rate matching block. The coded block may be rate matched before transmission.

A master information block may be transmitted in PBCH and may include system information transmitted on broadcast channel(s). The master information block may include downlink bandwidth, system frame number(s), and PHICH (physical hybrid-ARQ indicator channel) configuration. Downlink bandwidth may be the transmission bandwidth configuration, in terms of resource blocks in a downlink, for example 6 may correspond to 6 resource blocks, 15 may correspond to 15 resource blocks and so on. System frame number(s) may define the N (for example N=8) most significant bits of the system frame number. The M (for example M=2) least significant bits of the SFN may be acquired implicitly in the PBCH decoding. For example, timing of a 40 ms PBCH TTI may indicate 2 least significant bits (within 40 ms PBCH TTI, the first radio frame: 00, the second radio frame: 01, the third radio frame: 10, the last radio frame: 11). One value may apply for other carriers in the same sector of a base station (the associated functionality is common (e.g. not performed independently for each cell). PHICH configuration(s) may include PHICH duration, which may be normal (e.g. one symbol duration) or extended (e.g. 3 symbol duration).

Physical control format indicator channel(s) (PCFICH) may carry information about the number of OFDM symbols used for transmission of PDCCHs (physical downlink control channel) in a subframe. The set of OFDM symbols possible to use for PDCCH in a subframe may depend on many parameters including, for example, downlink carrier bandwidth, in terms of downlink resource blocks. PCFICH transmitted in one subframe may be scrambled with cell-specific sequence(s) prior to modulation, resulting in a block of scrambled bits. A scrambling sequence generator(s) may be initialized at the start of subframe(s). Block (s) of scrambled bits may be modulated using QPSK. Block(s) of modulation symbols may be mapped to at least one layer and precoded resulting in a block of vectors representing the signal for at least one antenna port. Instances of PCFICH control channel(s) may indicate one of several (e.g. 3) possible values after being decoded. The range of possible values of instance(s) of the first control channel may depend on the first carrier bandwidth.

According to some of the various embodiments, physical downlink control channel(s) may carry scheduling assignments and other control information. The number of resource-elements not assigned to PCFICH or PHICH may be assigned to PDCCH. PDCCH may support multiple formats. Multiple PDCCH packets may be transmitted in a subframe. PDCCH may be coded by tail biting convolutionally encoder before transmission. PDCCH bits may be scrambled with a cell-specific sequence prior to modulation, resulting in block(s) of scrambled bits. Scrambling sequence generator(s) may be initialized at the start of subframe(s). Block(s) of scrambled bits may be modulated using QPSK. Block(s) of modulation symbols may be mapped to at least one layer and precoded resulting in a block of vectors representing the signal for at least one antenna port. PDCCH may be transmitted on the same set of antenna ports as the PBCH, wherein PBCH is a physical broadcast channel broadcasting at least one basic system information field.

According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. OFDM subcarriers that are allocated for transmission of PDCCH may occupy the bandwidth of downlink carrier(s). PDCCH channel(s) may carry a plurality of downlink control packets in subframe(s). PDCCH may be transmitted on downlink carrier(s) starting from the first OFDM symbol of subframe(s), and may occupy up to multiple symbol duration(s) (e.g. 3 or 4).

According to some of the various embodiments, PHICH may carry the hybrid-ARQ (automatic repeat request) ACK/NACK. Multiple PHICHs mapped to the same set of resource elements may constitute a PHICH group, where PHICHs within the same PHICH group may be separated through different orthogonal sequences. PHICH resource(s) may be identified by the index pair (group, sequence), where group(s) may be the PHICH group number(s) and sequence(s) may be the orthogonal sequence index within the group(s). For frame structure type 1, the number of PHICH groups may depend on parameters from higher layers (RRC). For frame structure type 2, the number of PHICH groups may vary between downlink subframes according to a pre-defined arrangement. Block(s) of bits transmitted on one PHICH in one subframe may be modulated using BPSK or QPSK, resulting in a block(s) of complex-valued modulation symbols. Block(s) of modulation symbols may be symbol-wise multiplied with an orthogonal sequence and scrambled, resulting in a sequence of modulation symbols Other arrangements for PCFICH, PHICH, PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

According to some of the various aspects of embodiments, a random access procedure may be initiated by a physical downlink control channel (PDCCH) order and/or by the MAC sublayer in a wireless device. If a wireless device receives a PDCCH transmission consistent with a PDCCH order masked with its radio identifier, the wireless device may initiate a random access procedure. Preamble transmission(s) on physical random access channel(s) (PRACH) may be supported on a first uplink carrier and reception of a PDCCH order may be supported on a first downlink carrier.

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a first downlink carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may include a configurable timer (timeAlignmentTimer) that may be used to control how long the wireless device is considered uplink time aligned. When a timing alignment command MAC control element is received, the wireless device may apply the timing alignment command and start or restart timeAlignmentTimer. The wireless device may not perform any uplink transmission except the random access preamble transmission when timeAlignmentTimer is not running or when it exceeds its limit. The time alignment command may substantially align frame and subframe reception timing of a first uplink carrier and at least one additional uplink carrier. According to some of the various aspects of embodiments, the time alignment command value range employed during a random access process may be substantially larger than the time alignment command value range during active data transmission. In an example embodiment, uplink transmission timing may be maintained on a per time alignment group (TAG) basis. Carrier(s) may be grouped in TAGs, and TAG(s) may have their own downlink timing reference, time alignment timer, and/or time alignment commands. Group(s) may have their own random access process. Time alignment commands may be directed to a time alignment group. The TAG, including the primary cell may be called a primary TAG (pTAG) and the TAG not including the primary cell may be called a secondary TAG (sTAG).

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

According to some of the various aspects of embodiments, data packet(s) may be encrypted before transmission to secure packet(s) from unwanted receiver(s). Desired recipient(s) may be able to decrypt the packet(s). A first plurality of data packet(s) and/or a second plurality of data packet(s) may be encrypted using an encryption key and at least one parameter that may change substantially rapidly over time. The encryption mechanism may provide a transmission that may not be easily eavesdropped by unwanted receivers. The encryption mechanism may include additional parameter(s) in an encryption module that changes substantially rapidly in time to enhance the security mechanism. Example varying parameter(s) may comprise various types of system counter(s), such as system frame number. Substantially rapidly may for example imply changing on a per subframe, frame, or group of subframes basis. Encryption may be provided by a PDCP layer between the transmitter and receiver, and/or may be provided by the application layer. Additional overhead added to packet(s) by lower layers such as RLC, MAC, and/or Physical layer may not be encrypted before transmission. In the receiver, the plurality of encrypted data packet(s) may be decrypted using a first decryption key and at least one first parameter. The plurality of data packet(s) may be decrypted using an additional parameter that changes substantially rapidly over time.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/ deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier, CQI (channel quality indicator)/PMI (precoding matrix indicator)/RI (ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer.

According to some of the various aspects of embodiments, subcarriers and/or resource blocks may comprise a plurality of physical subcarriers and/or resource blocks. In another example embodiment, subcarriers may be a plurality of virtual and/or logical subcarriers and/or resource blocks.

According to some of the various aspects of embodiments, a radio bearer may be a GBR (guaranteed bit rate) bearer and/or a non-GBR bearer. A GBR and/or guaranteed bit rate bearer may be employed for transfer of real-time packets, and/or a non-GBR bearer may be used for transfer of non-real-time packets. The non-GBR bearer may be assigned a plurality of attributes including: a scheduling priority, an allocation and retention priority, a portable device aggregate maximum bit rate, and/or the like. These parameters may be used by the scheduler in scheduling non-GBR packets. GBR bearers may be assigned attributes such as delay, jitter, packet loss parameters, and/or the like.

According to some of the various aspects of embodiments, subcarriers may include data subcarrier symbols and pilot subcarrier symbols. Pilot symbols may not carry user data, and may be included in the transmission to help the receiver to perform synchronization, channel estimation and/or signal quality detection. Base stations and wireless devices (wireless receiver) may use different methods to generate and transmit pilot symbols along with information symbols.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like. According to some of the various aspects of embodiments of the present invention, layer 1 (physical layer) may be based on OFDMA or SC-FDMA. Time may be divided into frame(s) with fixed duration. Frame(s) may be divided into substantially equally sized subframes, and subframe(s) may be divided into substantially equally sized slot(s). A plurality of OFDM or SC-FDMA symbol(s) may be transmitted in slot(s). OFDMA or SC-FDMA symbol(s) may be grouped into resource block(s). A scheduler may assign resource(s) in resource block unit(s), and/or a group of resource block unit(s). Physical resource block(s) may be resources in the physical layer, and logical resource block(s) may be resource block(s) used by the MAC layer. Similar to virtual and physical subcarriers, resource block(s) may be mapped from logical to physical resource block(s). Logical resource block(s) may be contiguous, but corresponding physical resource block(s) may be non-contiguous. Some of the various embodiments of the present invention may be implemented at the physical or logical resource block level(s).

According to some of the various aspects of embodiments, layer 2 transmission may include PDCP (packet data convergence protocol), RLC (radio link control), MAC (media access control) sub-layers, and/or the like. MAC may be responsible for the multiplexing and mapping of logical channels to transport channels and vice versa. A MAC layer may perform channel mapping, scheduling, random access channel procedures, uplink timing maintenance, and/or the like.

According to some of the various aspects of embodiments, the MAC layer may map logical channel(s) carrying RLC PDUs (packet data unit) to transport channel(s). For transmission, multiple SDUs (service data unit) from logical channel(s) may be mapped to the Transport Block (TB) to be sent over transport channel(s). For reception, TBs from transport channel(s) may be demultiplexed and assigned to corresponding logical channel(s). The MAC layer may perform scheduling related function(s) in both the uplink and downlink and thus may be responsible for transport format selection associated with transport channel(s). This may include HARQ functionality. Since scheduling may be done at the base station, the MAC layer may be responsible for reporting scheduling related information such as UE (user equipment or wireless device) buffer occupancy and power headroom. It may also handle prioritization from both an inter-UE and intra-UE logical channel perspective. MAC may also be responsible for random access procedure(s) for the uplink that may be performed following either a contention and non-contention based process. UE may need to maintain timing synchronization with cell(s). The MAC layer may perform procedure(s) for periodic synchronization.

According to some of the various aspects of embodiments, the MAC layer may be responsible for the mapping of multiple logical channel(s) to transport channel(s) during transmission(s), and demultiplexing and mapping of transport channel data to logical channel(s) during reception. A MAC PDU may include of a header that describes the format of the PDU itself, which may include control element(s), SDUs, Padding, and/or the like. The header may be composed of multiple sub-headers, one for constituent part(s) of the MAC PDU. The MAC may also operate in a transparent mode, where no header may be pre-pended to the PDU. Activation command(s) may be inserted into packet(s) using a MAC control element.

According to some of the various aspects of embodiments, the MAC layer in some wireless device(s) may report buffer size(s) of either a single Logical Channel Group (LCG) or a group of LCGs to a base station. An LCG may be a group of logical channels identified by an LCG ID. The mapping of logical channel(s) to LCG may be set up during radio configuration. Buffer status report(s) may be used by a MAC scheduler to assign radio resources for packet transmission from wireless device(s). HARQ and ARQ processes may be used for packet retransmission to enhance the reliability of radio transmission and reduce the overall probability of packet loss.

According to some of the various aspects of embodiments, an RLC sub-layer may control the applicability and functionality of error correction, concatenation, segmentation, re-segmentation, duplicate detection, in-sequence delivery, and/or the like. Other functions of RLC may include protocol error detection and recovery, and/or SDU discard. The RLC sub-layer may receive data from upper layer radio bearer(s) (signaling and data) called service data unit(s) (SDU). The transmission entities in the RLC layer may convert RLC SDUs to RLC PDU after performing functions such as segmentation, concatenation, adding RLC header(s), and/or the like. In the other direction, receiving entities may receive RLC PDUs from the MAC layer. After performing reordering, the PDUs may be assembled back into RLC SDUs and delivered to the upper layer. RLC interaction with a MAC layer may include: a) data transfer for uplink and downlink through logical channel(s); b) MAC notifies RLC when a transmission opportunity becomes available, including the size of total number of RLC PDUs that may be transmitted in the current transmission opportunity, and/or c) the MAC entity at the transmitter may inform RLC at the transmitter of HARQ transmission failure.

According to some of the various aspects of embodiments, PDCP (packet data convergence protocol) may comprise a layer 2 sub-layer on top of RLC sub-layer. The PDCP may be responsible for a multitude of functions. First, the PDCP layer may transfer user plane and control plane data to and from upper layer(s). PDCP layer may receive SDUs from upper layer(s) and may send PDUs to the lower layer(s). In other direction, PDCP layer may receive PDUs from the lower layer(s) and may send SDUs to upper layer(s). Second, the PDCP may be responsible for security functions. It may apply ciphering (encryption) for user and control plane bearers, if configured. It may also perform integrity protection for control plane bearer(s), if configured. Third, the PDCP may perform header compression service(s) to improve the efficiency of over the air transmission. The header compression may be based on robust header compression (ROHC). ROHC may be performed on VOIP packets. Fourth, the PDCP may be responsible for in-order delivery of packet(s) and duplicate detection service(s) to upper layer(s) after handover(s). After handover, the source base station may transfer unacknowledged packet(s)s to target base station when operating in RLC acknowledged mode (AM). The target base station may forward packet(s)s received from the source base station to the UE (user equipment).

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
    receiving, by a first base station:
        first configuration information indicating a starting symbol parameter that is indicative of a start, in at least one subframe, of a first physical downlink control channel associated with the first base station; and
        second configuration information indicating that the first physical downlink control channel is to be transmitted by the first base station in fewer than all resource blocks of the at least one subframe;
    receiving, by a second base station, the first configuration information; and
    transmitting, by the second base station, a second physical downlink control channel using second radio resources that are configured, based on the first configuration information, to manage overlap with first radio resources of the first physical downlink control channel.

2. The method of claim 1, wherein the first physical downlink control channel is an enhanced physical downlink control channel (ePDCCH), and wherein the second physical downlink control channel is an ePDCCH.

3. The method of claim 1, wherein the first configuration information comprises a bitmap indicating the first radio resources of the first physical downlink control channel.

4. The method of claim 1, wherein the first configuration information comprises an index indicating a pre-defined set of resource blocks that comprise the first radio resources of the first physical downlink control channel.

5. The method of claim 1, wherein the first configuration information comprises an indication of a starting offset and bandwidth for the first physical downlink control channel.

6. The method of claim 1, wherein the first configuration information further indicates a subset of subframes for the first physical downlink control channel.

7. The method of claim 1, further comprising configuring, by the second base station and based on the first configuration information, the second radio resources to reduce overlap between the first radio resources and the second radio resources.

8. The method of claim 1, further comprising transmitting, by a computing device and to the first base station, a protected physical downlink control channel carrier component preference list.

9. The method of claim 1, wherein the starting symbol parameter indicates a particular symbol at which the first physical downlink control channel starts.

10. A method comprising:
    receiving, by a first base station, configuration information indicating:
        a starting symbol parameter that is indicative of a start of a first physical downlink control channel associated with the first base station; and
        that the first physical downlink control channel is to be transmitted by the first base station in fewer than all resource blocks of a subframe;
    transmitting, by the first base station, the first physical downlink control channel using first radio resources that are based on the configuration information;
    receiving, by a second base station, the configuration information; and
    transmitting, by the second base station, a second physical downlink control channel using second radio resources that are overlap-managed, based on the starting symbol parameter, with respect to the first radio resources.

11. The method of claim 10, wherein the first physical downlink control channel is an enhanced physical downlink control channel (ePDCCH), and wherein the second physical downlink control channel is an ePDCCH.

12. The method of claim 10, wherein the configuration information comprises a bitmap indicating the first radio resources of the first physical downlink control channel.

13. The method of claim 10, wherein the configuration information comprises an index indicating a pre-defined set of resource blocks that comprise the first radio resources of the first physical downlink control channel.

14. The method of claim 10, wherein the configuration information comprises an indication of a starting offset and bandwidth for the first physical downlink control channel.

15. The method of claim 10, wherein the configuration information further indicates a subset of subframes for the first physical downlink control channel.

16. The method of claim 10, further comprising configuring, by the second base station and based on the configuration information, the second radio resources to reduce overlap between the first radio resources and the second radio resources.

17. The method of claim 10, further comprising transmitting, by a computing device and to the first base station, a protected physical downlink control channel carrier component preference list.

18. The method of claim 10, wherein the starting symbol parameter indicates a particular symbol at which the first physical downlink control channel starts.

19. A method comprising:
transmitting, by a computing device and to a first base station:
first configuration information indicating a starting symbol parameter that is indicative of a start of a first physical downlink control channel associated with the first base station; and
second configuration information indicating that the first physical downlink control channel is to be transmitted by the first base station in fewer than all resource blocks of a subframe; and
transmitting, by the computing device and to a second base station, the first configuration information to allow the second base station to manage overlap between first radio resources of the first physical downlink control channel associated with the first base station and second radio resources of a second physical downlink control channel associated with the second base station.

20. The method of claim 19, wherein the first physical downlink control channel is an enhanced physical downlink control channel (ePDCCH), and wherein the second physical downlink control channel is an ePDCCH.

21. The method of claim 19, wherein the first configuration information comprises a bitmap indicating the first radio resources of the first physical downlink control channel.

22. The method of claim 19, wherein the first configuration information comprises an index indicating a pre-defined set of resource blocks that comprise the first radio resources of the first physical downlink control channel.

23. The method of claim 19, wherein the first configuration information comprises an indication of a starting offset and bandwidth for the first physical downlink control channel.

24. The method of claim 19, wherein the first configuration information further indicates a subset of subframes for the first physical downlink control channel.

25. The method of claim 19, further comprising configuring, by the second base station and based on the first configuration information, the second radio resources to reduce overlap between the first radio resources and the second radio resources.

26. The method of claim 19, further comprising transmitting, by the computing device and to the first base station, a protected physical downlink control channel carrier component preference list.

27. The method of claim 19, wherein the starting symbol parameter indicates a particular symbol at which the first physical downlink control channel starts.

28. A method comprising:
transmitting, by a computing device and to a first base station, configuration information indicating:
a starting symbol parameter that is indicative of a start of a first physical downlink control channel associated with the first base station; and
that the first physical downlink control channel is to be transmitted by the first base station in fewer than all resource blocks of a subframe; and
transmitting, by the computing device and to a second base station, the configuration information to allow the second base station to transmit a second physical downlink control channel, associated with the second base station, using second radio resources that are overlap-managed, based on the starting symbol parameter, with respect to first radio resources of the first physical downlink control channel.

29. The method of claim 28, wherein the first physical downlink control channel is an enhanced physical downlink control channel (ePDCCH), and wherein the second physical downlink control channel is an ePDCCH.

30. The method of claim 28, wherein the configuration information comprises a bitmap indicating the first radio resources of the first physical downlink control channel.

31. The method of claim 28, wherein the configuration information comprises an index indicating a pre-defined set of resource blocks that comprise the first radio resources of the first physical downlink control channel.

32. The method of claim 28, wherein the configuration information comprises an indication of a starting offset and bandwidth for the first physical downlink control channel.

33. The method of claim 28, wherein the configuration information further indicates a subset of subframes for the first physical downlink control channel.

34. The method of claim 28, wherein the second radio resources are overlap-managed to reduce overlap with the first radio resources.

35. The method of claim 28, further comprising transmitting, by the computing device and to the first base station, a protected physical downlink control channel carrier component preference list.

36. The method of claim 28, wherein the starting symbol parameter indicates a particular symbol at which the first physical downlink control channel starts.

37. A system comprising:
a first base station and a second base station,
wherein the first base station comprises:
one or more processors; and
memory storing instructions that, when executed by the one or more processors of the first base station, cause the first base station to receive:
first configuration information indicating a starting symbol parameter that is indicative of a start, in at least one subframe, of a first physical downlink control channel associated with the first base station; and
second configuration information indicating that the first physical downlink control channel is to be transmitted by the first base station in fewer than all resource blocks of the at least one subframe; and
wherein the second base station comprises:
one or more processors; and
memory storing instructions that, when executed by the one or more processors of the second base station, cause the second base station to:
receive the first configuration information; and
transmit a second physical downlink control channel using second radio resources that are configured, based on the first configuration information, to manage overlap with first radio resources of the first physical downlink control channel.

38. The system of claim 36, wherein the first physical downlink control channel is an enhanced physical downlink control channel (ePDCCH), and wherein the second physical downlink control channel is an ePDCCH.

39. The system of claim 36, wherein:
the first configuration information comprises a bitmap indicating the first radio resources of the first physical downlink control channel;
the first configuration information comprises an index indicating a pre-defined set of resource blocks that comprise the first radio resources of the first physical downlink control channel;
the first configuration information comprises an indication of a starting offset and bandwidth for the first physical downlink control channel; or
the first configuration information further indicates a subset of subframes for the first physical downlink control channel.

40. The system of claim 36, wherein the instructions in the memory of the second base station, when executed by the one or more processors of the second base station, cause the second base station to configure, based on the first configuration information, the second radio resources to reduce overlap between the first radio resources and the second radio resources.

41. The system of claim 37, wherein the instructions in the memory of the first base station, when executed by the one or more processors of the first base station, cause the first base station to receive a protected physical downlink control channel carrier component preference list.

42. The system of claim 36, wherein the starting symbol parameter indicates a particular symbol at which the first physical downlink control channel starts.

43. A system comprising:
a first base station and a second base station,
wherein the first base station comprises:
one or more processors; and
memory storing instructions that, when executed by the one or more processors of the first base station, cause the first base station to:
receive configuration information indicating:
a starting symbol parameter that is indicative of a start of a first physical downlink control channel associated with the first base station; and
that the first physical downlink control channel is to be transmitted by the first base station in fewer than all resource blocks of a subframe; and
transmit the first physical downlink control channel using first radio resources that are based on the configuration information; and
wherein the second base station comprises:
one or more processors; and
memory storing instructions that, when executed by the one or more processors of the second base station, cause the second base station to:
receive the configuration information; and
transmit a second physical downlink control channel using second radio resources that are overlap-managed, based on the starting symbol parameter, with respect to the first radio resources.

44. The system of claim 43, wherein the first physical downlink control channel is an enhanced physical downlink control channel (ePDCCH), and wherein the second physical downlink control channel is an ePDCCH.

45. The system of claim 43, wherein:
the configuration information comprises a bitmap indicating the first radio resources of the first physical downlink control channel;
the configuration information comprises an index indicating a pre-defined set of resource blocks that comprise the first radio resources of the first physical downlink control channel;
the configuration information comprises an indication of a starting offset and bandwidth for the first physical downlink control channel; or
the configuration information further indicates a subset of subframes for the first physical downlink control channel.

46. The system of claim 43, wherein the instructions in the memory of the second base station, when executed by the one or more processors of the second base station, cause the second base station to configure, based on the configuration information, the second radio resources to reduce overlap between the first radio resources and the second radio resources.

47. The system of claim 43, wherein the instructions in the memory of the first base station, when executed by the one or more processors of the first base station, cause the first base station to receive a protected physical downlink control channel carrier component preference list.

48. The system of claim 43, wherein the starting symbol parameter indicates a particular symbol at which the first physical downlink control channel starts.

49. An apparatus comprising:
one or more processors; and
memory storing instructions that, when executed by the one or more processors, cause the apparatus to:
transmit, to a first base station:
first configuration information indicating a starting symbol parameter that is indicative of a start of a first physical downlink control channel associated with the first base station; and
second configuration information indicating that the first physical downlink control channel is to be transmitted by the first base station in fewer than all resource blocks of a subframe; and
transmit, to a second base station, the first configuration information to allow the second base station to manage overlap between first radio resources of the first physical downlink control channel associated with the first base station and second radio resources of a second physical downlink control channel associated with the second base station.

50. The apparatus of claim 49, wherein the first physical downlink control channel is an enhanced physical downlink control channel (ePDCCH), and wherein the second physical downlink control channel is an ePDCCH.

51. The apparatus of claim 49, wherein:
the first configuration information comprises a bitmap indicating the first radio resources of the first physical downlink control channel;
the first configuration information comprises an index indicating a pre-defined set of resource blocks that comprise the first radio resources of the first physical downlink control channel;
the first configuration information comprises an indication of a starting offset and bandwidth for the first physical downlink control channel; or
the first configuration information further indicates a subset of subframes for the first physical downlink control channel.

52. The apparatus of claim 49, wherein the instructions, when executed by the one or more processors, further cause the apparatus to transmit, to the first base station, a protected physical downlink control channel carrier component preference list.

53. The apparatus of claim 49, wherein the starting symbol parameter indicates a particular symbol at which the first physical downlink control channel starts.

54. An apparatus comprising:
one or more processors; and
memory storing instructions that, when executed by the one or more processors, cause the apparatus to:
  transmit, to a first base station, configuration information indicating:
    a starting symbol parameter that is indicative of a start of a first physical downlink control channel associated with the first base station; and
    that the first physical downlink control channel is to be transmitted by the first base station in fewer than all resource blocks of a subframe; and
  transmit, to a second base station, the configuration information to allow the second base station to transmit a second physical downlink control channel, associated with the second base station, using second radio resources that are overlap-managed, based on the starting symbol parameter, with respect to first radio resources of the first physical downlink control channel.

55. The apparatus of claim 54, wherein the first physical downlink control channel is an enhanced physical downlink control channel (ePDCCH), and wherein the second physical downlink control channel is an ePDCCH.

56. The apparatus of claim 54, wherein:
  the configuration information comprises a bitmap indicating the first radio resources of the first physical downlink control channel;
  the configuration information comprises an index indicating a pre-defined set of resource blocks that comprise the first radio resources of the first physical downlink control channel;
  the configuration information comprises an indication of a starting offset and bandwidth for the first physical downlink control channel; or
  the configuration information further indicates a subset of subframes for the first physical downlink control channel.

57. The apparatus of claim 54, wherein the second radio resources are overlap-managed to reduce overlap with the first radio resources.

58. The apparatus of claim 54, wherein the instructions, when executed by the one or more processors, further cause the apparatus to transmit, to the first base station, a protected physical downlink control channel carrier component preference list.

59. The apparatus of claim 54, wherein the starting symbol parameter indicates a particular symbol at which the first physical downlink control channel starts.

* * * * *

UNITED STATES PATENT AND TRADEMARK OFFICE
CERTIFICATE OF CORRECTION

PATENT NO. : 10,397,913 B2
APPLICATION NO. : 15/818252
DATED : August 27, 2019
INVENTOR(S) : Dinan Page 1 of 2

It is certified that error appears in the above-identified patent and that said Letters Patent is hereby corrected as shown below:

On the Title Page

Page 3, Column 2, Item (56) Other Publications, Line 7:
Delete "BEII," and insert --Bell,-- therefor In the Specification Column 2, Detailed Description of Embodiments, Lines 35-36:
Delete "Carrier A" and insert --Carrier 1-- therefor Column 2, Detailed Description of Embodiments, Line 36:
Delete "carrier B" and insert --carrier 2-- therefor Column 2, Detailed Description of Embodiments, Line 38:
Delete "carrier A" and insert --carrier 1-- therefor Column 2, Detailed Description of Embodiments, Line 38:
Delete "carrier B" and insert --carrier 2-- therefor Column 18, Detailed Description of Embodiments, Line 28:
Delete "2," and insert --two 712,-- therefor Column 34, Detailed Description of Embodiments, Line 51:
Delete "Pcell" and insert --PCell-- therefor Column 34, Detailed Description of Embodiments, Line 66:
Delete "Pcell and Scell" and insert --PCell and SCell-- therefor Column 35, Detailed Description of Embodiments, Line 7:
Delete "Pcell" and insert --PCell-- therefor Signed and Sealed this
Twenty-seventh Day of February, 2024

Katherine Kelly Vidal
*Director of the United States Patent and Trademark Office*

Column 35, Detailed Description of Embodiments, Line 36:
Delete "Pcell" and insert --PCell-- therefor Column 35, Detailed Description of Embodiments, Line 39:
Delete "Scell" and insert --SCell-- therefor Column 35, Detailed Description of Embodiments, Line 51:
Delete "Pcell" and insert --PCell-- therefor Column 35, Detailed Description of Embodiments, Line 54:
Delete "Scell" and insert --SCell-- therefor Column 36, Detailed Description of Embodiments, Line 12:
Delete "Pcell" and insert --PCell-- therefor Column 37, Detailed Description of Embodiments, Line 9:
Delete "15," and insert --{5},-- therefor Column 40, Detailed Description of Embodiments, Line 39:
Delete "Block (s)" and insert --Block(s)-- therefor Column 48, Detailed Description of Embodiments, Line 14:
Delete "packet(s)s" and insert --packet(s)-- therefor Column 48, Detailed Description of Embodiments, Line 16:
Delete "packet(s)s" and insert --packet(s)-- therefor In the Claims Column 52, Claim 38, Line 64:
Delete "claim 36," and insert --claim 37,-- therefor Column 53, Claim 39, Line 1:
Delete "claim 36," and insert --claim 37,-- therefor Column 53, Claim 40, Line 16:
Delete "claim 36," and insert --claim 37,-- therefor Column 53, Claim 42, Line 28:
Delete "claim 36," and insert --claim 37,-- therefor